(12) United States Patent
Sato et al.

(10) Patent No.: US 12,434,455 B2
(45) Date of Patent: Oct. 7, 2025

(54) MULTILAYER FOAM SHEET AND ADHESIVE TAPE

(71) Applicant: SEKISUI CHEMICAL CO., LTD., Osaka (JP)

(72) Inventors: Kento Sato, Tokyo (JP); Hiroki Matsukawa, Koshigaya (JP); Masahiro Hamada, Shiraoka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 258 days.

(21) Appl. No.: 18/031,463

(22) PCT Filed: Oct. 6, 2021

(86) PCT No.: PCT/JP2021/037064
§ 371 (c)(1),
(2) Date: Apr. 12, 2023

(87) PCT Pub. No.: WO2022/080219
PCT Pub. Date: Apr. 21, 2022

(65) Prior Publication Data
US 2023/0382082 A1 Nov. 30, 2023

(30) Foreign Application Priority Data

| Oct. 14, 2020 | (JP) | 2020-173425 |
| Feb. 26, 2021 | (JP) | 2021-030594 |
| Sep. 30, 2021 | (JP) | 2021-162408 |

(51) Int. Cl.
*B32B 5/32* (2006.01)
*B32B 5/18* (2006.01)
(Continued)

(52) U.S. Cl.
CPC ............. *B32B 5/32* (2013.01); *B32B 5/18* (2013.01); *B32B 7/02* (2013.01); *B32B 27/065* (2013.01);
(Continued)

(58) Field of Classification Search
CPC ........... B32B 2250/02; B32B 2250/03; B32B 2250/04; B32B 2250/05; B32B 2250/40;
(Continued)

(56) References Cited

U.S. PATENT DOCUMENTS

| 2012/0000384 A1* | 1/2012 | Vest ................. B41N 1/12 |
| | | 101/401.1 |
| 2018/0355219 A1 | 12/2018 | Nagai et al. |
| 2021/0340347 A1 | 11/2021 | Matsui |

FOREIGN PATENT DOCUMENTS

| CN | 105121529 | 12/2015 |
| JP | 63-19232 | 1/1988 |

(Continued)

OTHER PUBLICATIONS

International Search Report (ISR) issued Dec. 7, 2021 in International (PCT) Application No. PCT/JP2021/037064.

*Primary Examiner* — Lawrence D Ferguson
(74) *Attorney, Agent, or Firm* — WENDEROTH, LIND & PONACK, L.L.P.

(57) ABSTRACT

Provided is a multilayer foam sheet excellent in flexibility and mechanical strength in the shear direction.
A multilayer foam sheet of the present invention is a multilayer foam sheet including: a base layer including a foam layer, and a surface layer including a foam layer or a resin film and laminated on at least one side of the base layer directly or with another layer interposed therebetween, a low-speed shear modulus being 50 MPa or more, and a 25% compressive strength being 125 kPa or less.

12 Claims, 1 Drawing Sheet

(51) Int. Cl.
*B32B 7/02* (2019.01)
*B32B 27/06* (2006.01)
*B32B 27/16* (2006.01)
*B32B 27/32* (2006.01)
*C09J 7/26* (2018.01)
*C09J 7/38* (2018.01)

(52) U.S. Cl.
CPC .............. *B32B 27/16* (2013.01); *B32B 27/32* (2013.01); *C09J 7/26* (2018.01); *C09J 7/38* (2018.01); *B32B 2250/42* (2013.01); *B32B 2266/025* (2013.01); *B32B 2266/08* (2013.01); *B32B 2266/104* (2016.11); *B32B 2274/00* (2013.01); *B32B 2307/54* (2013.01); *B32B 2307/542* (2013.01); *B32B 2307/72* (2013.01); *B32B 2307/7376* (2023.05); *B32B 2405/00* (2013.01); *C09J 2301/16* (2020.08); *C09J 2423/006* (2013.01)

(58) Field of Classification Search
CPC .......... B32B 2250/42; B32B 2266/025; B32B 2266/0292; B32B 2266/08; B32B 2266/10; B32B 2266/104; B32B 2274/00; B32B 2307/54; B32B 2307/542; B32B 2307/72; B32B 2307/7246; B32B 2307/7376; B32B 2405/00; B32B 2457/20; B32B 27/065; B32B 27/16; B32B 27/32; B32B 27/327; B32B 3/06; B32B 5/18; B32B 5/32; B32B 7/02; B32B 7/022; B32B 7/12; C09J 2203/318; C09J 2301/16; C09J 2301/162; C09J 2301/302; C09J 2301/312; C09J 2400/243; C09J 2423/006; C09J 7/26; C09J 7/29; C09J 7/38

See application file for complete search history.

(56) References Cited

FOREIGN PATENT DOCUMENTS

| | | |
|---|---|---|
| JP | 2014-28925 | 2/2014 |
| JP | 2019-65123 | 4/2019 |
| JP | 2019-137795 | 8/2019 |
| JP | 2019-171819 | 10/2019 |
| JP | 2020-32599 | 3/2020 |
| JP | 2020-163632 | 10/2020 |
| JP | 2022-064669 | 4/2022 |
| WO | 2018/084318 | 5/2018 |
| WO | 2020/067538 | 4/2020 |
| WO | 2020/158886 | 8/2020 |

* cited by examiner

MULTILAYER FOAM SHEET AND ADHESIVE TAPE

TECHNICAL FIELD

The present invention relates to a multilayer foam sheet and pressure-sensitive adhesive tape comprising the multilayer foam sheet.

BACKGROUND ART

In electronic devices such as mobile phones, cameras, displays, game devices, electronic organizers, and personal computers, foam sheets are broadly used as sealing material or impact absorbing material. At least one side of such a foam sheet may be applied with a pressure-sensitive adhesive to make pressure-sensitive adhesive tape which is used inside electronic devices. As foam sheets for use in these applications, crosslinked polyolefin resin foam sheets obtained by foaming and crosslinking an expandable polyolefin resin sheet including a thermally decomposable foaming agent have been conventionally known (e.g., see Patent Literature 1).

CITATION LIST

Patent Literature

PTL1: JP 2014-28925 A

SUMMARY OF INVENTION

Technical Problem

In recent years, foam sheets used inside electronic devices have been used for the purpose of properties such as cushioning property and water-tightness. As applications such as wall mounting and oblique mounting increase for televisions and the like comprising a large display, a foam sheet that can endure forces in the direction perpendicular to the thickness direction of the sheet (shear direction) has been required.

In order to improve the mechanical strength in the shear direction, lowering the expansion ratio of a foam is conceivable. However, in this case, although the mechanical strength is improved, the flexibility decreases, and thus defects are more likely to occur when the foam is used in electronic devices. Accordingly, a foam sheet excellent both in flexibility and mechanical strength in the shear direction is desired.

The present invention has been made in view of the above conventional problems, and a first object thereof is to provide a multilayer foam sheet excellent both in flexibility and mechanical strength in the shear direction, and pressure-sensitive adhesive tape including the multilayer foam sheet.

In recent years, foam sheets used inside electronic devices have been used for the purpose of properties such as cushioning property and water-tightness. For example, when an electronic device is a display, the foam sheet is disposed for this purpose between a full face plate and a housing in the portion of the housing into which the full face plate is fitted. At this time, if the foam sheet cannot conform to a level difference in the housing necessary for wiring to pass therethrough, the full face plate will be not parallel. As a result, unevenness in the screen may occur in the display. Alternatively, waterproofness or dustproofness by the foam sheet may become insufficient. Further, in recent years, the design of displays has increasingly tended to be emphasized, and expensive housings have been used. For this reason, foam sheets are required to have a capability to be reworked without breaking the housing when a display is repaired.

Thus, a second object of the present invention is to provide a multilayer foam sheet excellent both in level-difference conformability and reworkability, and pressure-sensitive adhesive tape including the multilayer foam sheet.

Hard disks mounted on electronic devices have an increasingly larger writing capacity. In the case of writing in and reading out from a hard disk in an atmospheric environment, impingement of atmospheric molecules while the disk is rotating causes the disk to vibrate to thereby reduce the capacity for writing in and reading out. Then, the environment for writing in and reading out from a hard disk is preferably in vacuo, but it is difficult to maintain a vacuum environment. Accordingly, a hard disk may be used under a gas-purged environment purged with helium or the like of a smaller molecular weight, which has less influence on disk rotation. A hard disk purged with gas requires maintenance of a gas-purged environment, but the gas purged may be released during transport or the like, and thus the maintenance of the gas-purged environment may be failed. In order to maintain the gas-purged environment of the hard disk, a foam sheet may be used as a sealing material on the outer periphery of the housing of the hard disk. However, a conventional foam sheet used for sealing the outer periphery of the housing of a hard disk, which is an electronic device, has insufficient gas sealability and level-difference conformability, having difficulty in maintaining the gas-purged environment.

Thus, a third object of the present invention is to provide a multilayer foam sheet excellent in gas sealability and level-difference conformability, and pressure-sensitive adhesive tape including the multilayer foam sheet.

Solution to Problem

The present inventors have made intensive studies to solve the above first object. As a result, the present inventors have found that the above object can be solved by a multilayer foam sheet comprising: a base layer comprising a foam layer; and a surface layer comprising a foam layer or a resin film and laminated on at least one side of the base layer directly or with another layer interposed therebetween, the multilayer foam sheet having a predetermined 25% compressive strength and a low-speed shear modulus, having completed the following present invention.

That is, the first embodiment of the present invention provides the following [1] to [12].

[1] A multilayer foam sheet comprising: a base layer comprising a foam layer; and a surface layer comprising a foam layer or a resin film and laminated on at least one side of the base layer, a low-speed shear modulus being 50 MPa or more, and a 25% compressive strength being 125 kPa or less.

[2] The multilayer foam sheet according to the above [1], wherein the surface layer is laminated on each of both sides of the base layer.

[3] The multilayer foam sheet according to the above [1] or [2], wherein a tensile strength at break is 10 N/10 mm or more.

[4] The multilayer foam sheet according to any of the above [1] to [3], wherein a density is from 0.07 to 0.22 g/cm$^3$.

[5] The multilayer foam sheet according to any of the above [1] to [4], wherein a ratio of a thickness of the base layer to a thickness of the surface layer (thickness of base layer/thickness of surface layer) is 2.0 or more.

[6] The multilayer foam sheet according to any of the above [1] to [5], wherein a thickness is from 30 to 2000 µm.

[7] The multilayer foam sheet according to any of the above [1] to [6], wherein an average cell diameter of the base layer is from 20 to 500 µm.

[8] The multilayer foam sheet according to any of the above [1] to [7], wherein a closed cell ratio is 90% or more.

[9] The multilayer foam sheet according to any of the above [1] to [8], wherein a gel fraction is from 30 to 80%.

[10] The multilayer foam sheet according to any of the above [1] to [9], wherein the base layer comprises at least one resin selected from the group consisting of an olefinic thermoplastic resin and a thermoplastic elastomer.

[11] A pressure-sensitive adhesive tape comprising the multilayer foam sheet
according to any of the above [1] to [10], and an adhesive material provided on at least one side of the multilayer foam sheet.

[12] The pressure-sensitive adhesive tape according to the above [11] to be used in a display of 20 inches or larger.

The present inventors have made intensive studies to solve the above second object. As a result, the present inventors have found that the above object can be solved by a multilayer foam sheet comprising: a base layer comprising a foam layer; and a surface layer comprising a foam layer or a resin film and laminated on at least one side of the base layer directly or with another layer interposed therebetween, the multilayer foam sheet having a predetermined 25% compressive strength and tensile strength at break, having completed the following present invention.

That is, the second embodiment of the present invention provides the following [13] to [25].

[13] A multilayer foam sheet comprising: a base layer comprising a foam layer; and a surface layer comprising a foam layer or a resin film and laminated on at least one side of the base layer, a 25% compressive strength being 125 kPa or less, and a tensile strength at break being from 10 to 700 N/10 mm.

[14] The multilayer foam sheet according to the above [13], wherein the surface layer is laminated on each of both sides of the base layer.

[15] The multilayer foam sheet according to the above or [14], wherein a density is from 0.07 to 0.22 g/cm³.

[16] The multilayer foam sheet according to any of the above [13] to [15], wherein a ratio of a thickness of the base layer to a thickness of the surface layer (thickness of base layer/thickness of surface layer) is 2.0 or more.

[17] The multilayer foam sheet according to any of the above [13] to [16], wherein a thickness is from 30 to 2000 µm.

[18] The multilayer foam sheet according to any of the above [13] to [17], wherein an average cell diameter of the base layer is from 20 to 500 µm.

[19] The multilayer foam sheet according to any of the above [13] to [18], wherein a closed cell ratio is 90% or more.

[20] The multilayer foam sheet according to any of the above [13] to [19], wherein a gel fraction is from 30 to 80%.

[21] The multilayer foam sheet according to any of the above [13] to [20], wherein the base layer comprises at least one resin selected from the group consisting of an olefinic thermoplastic resin and a thermoplastic elastomer.

[22] A pressure-sensitive adhesive tape comprising: the multilayer foam sheet according to any of the above [13] to [21]; and a pressure-sensitive adhesive material provided on at least one side of the multilayer foam sheet.

[23] The pressure-sensitive adhesive tape according to the above [22] to be used in a back face or a frame of a display.

[24] The pressure-sensitive adhesive tape according to the above or to be used in a display of 20 inches or larger.

[25] The pressure-sensitive adhesive tape according to any of the above [22] to [24], wherein when the pressure-sensitive adhesive tape is bonded to an adherend having a level difference, an area of a gap between the pressure-sensitive adhesive tape and the adherend is from 0 to 3.0 cm².

The present inventors have made intensive studies to solve the above third object. As a result, the present inventors have found that the above object can be solved by a multilayer foam sheet comprising: a base layer comprising a foam layer or a resin film; and a surface layer comprising a foam layer or a resin film and laminated on at least one side of the base layer, the multilayer foam sheet having a predetermined 25% compressive strength and moisture permeability, having completed the following present invention.

That is, the third embodiment of the present invention provides the following [26] to [36].

[26] A multilayer foam sheet comprising: a base layer comprising a foam layer or a resin film; and a surface layer comprising a foam layer or a resin film and laminated on at least one side of the base layer, at least either of the base layer or the surface layer being a foam layer, a 25% compressive strength being 125 kPa or less, and a moisture permeability being 15 g/m·24 hr or less.

[27] The multilayer foam sheet according to the above [26], wherein the surface layer is laminated on each of both sides of the base layer.

[28] The multilayer foam sheet according to the above [26] or [27], wherein a density is from 0.07 to 0.60 g/cm³.

[29] The multilayer foam sheet according to any of the above [26] to [28], wherein a ratio of a thickness of the base layer to a thickness of the surface layer (thickness of base layer/thickness of surface layer) is 2.0 or more.

[30] The multilayer foam sheet according to any of the above [26] to [29], wherein a thickness is from 30 to 2000 µm.

[31] The multilayer foam sheet according to any of the above [26] to [30], wherein an average cell diameter of the base layer is from 20 to 500 µm.

[32] The multilayer foam sheet according to any of the above [26] to [31], wherein a closed cell ratio is 90% or more.

[33] The multilayer foam sheet according to any of the above [26] to [32], wherein a gel fraction is from 15 to 80%.

[34] The multilayer foam sheet according to any of the above [26] to [33], wherein the base layer comprises at least one resin selected from the group consisting of an olefinic thermoplastic resin and a thermoplastic elastomer.

[35] A pressure-sensitive adhesive tape comprising: the multilayer foam sheet
according to any of the above [26] to [34]; and a pressure-sensitive adhesive material provided on at least one side of the multilayer foam sheet.

[36] The pressure-sensitive adhesive tape according to the above [35] to be used for temporary fixing to maintain a gas-purged environment.

Advantageous Effects of Invention

According to the first embodiment of the present invention, a multilayer foam sheet excellent in flexibility and mechanical strength in the shear direction, and pressure-sensitive adhesive tape including the multilayer foam sheet can be provided.

According to the second embodiment of the present invention, a foam sheet excellent both in level-difference conformability and reworkability, and pressure-sensitive adhesive tape including the multilayer foam sheet can be provided.

According to the third embodiment of the present invention, a multilayer foam sheet excellent in gas sealability and level-difference conformability, and pressure-sensitive adhesive tape including the multilayer foam sheet can be provided.

DESCRIPTION OF EMBODIMENTS

Figure 1:
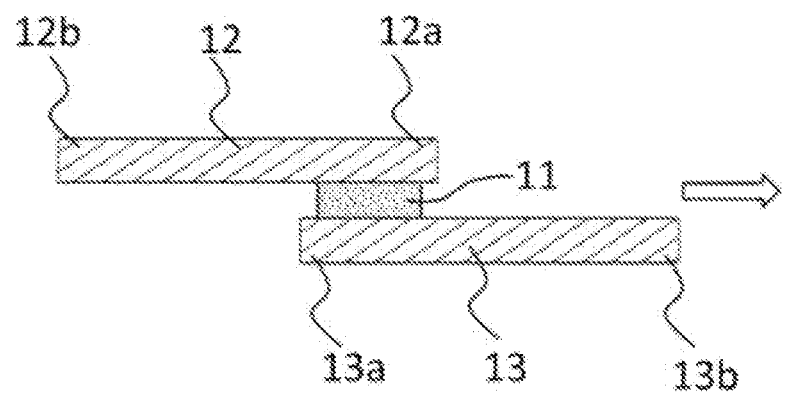
FIG. 1 illustrates a method for measuring the low-speed shear modulus.

Hereinafter, the present invention will be described in detail using the embodiments.

First Embodiment

[Foam Sheet]

A multilayer foam sheet according to the first embodiment of the present invention is a multilayer foam sheet comprising a base layer comprising a foam layer, and a surface layer comprising a foam layer or a resin film and laminated on at least one side of the base layer, wherein a low-speed shear modulus is 50 MPa or more, and a 25% compressive strength is 125 kPa or less. This allows the multilayer foam sheet to be excellent in flexibility and mechanical strength in the shear direction.

Low-Speed Shear Modulus

The multilayer foam sheet according to the first embodiment of the present invention has a low-speed shear modulus of 50 MPa or more. When the low-speed shear modulus is less than 50 MPa, the mechanical strength in the shear direction of the multilayer foam sheet decreases. The shear direction means a direction perpendicular to the thickness direction of the sheet.

The low-speed shear modulus of the multilayer foam sheet is preferably 60 MPa or more, more preferably 80 MPa or more, and further preferably 100 MPa or more, from a viewpoint of more improving the mechanical strength in the shear direction. From the viewpoint of enhancing the mechanical strength in the shear direction of the multilayer foam sheet, the low-speed shear modulus is preferably higher, but in consideration of the balance with flexibility, the low-speed shear modulus is preferably 300 MPa or less and more preferably 200 MPa or less. The low-speed shear modulus can be obtained by a tensile test under conditions of a tensile rate of 100 mm/min in accordance with the measurement method described below.

The low-speed shear modulus can be adjusted to a desired value by controlling the thickness of the base layer and the surface layer composing the multilayer foam sheet, the expansion ratio, the cell diameter, and the like.

Hereinafter, a method for measuring the low-speed shear modulus will be described with reference to FIG. 1.

The multilayer foam sheet according to the first embodiment of the present invention is cut into a size of 5 mm×30 mm to prepare a test piece 11. A wood plate 12 and a wood plate 13 are provided separately. These 2 wood plates each has a size of 30 mm×98 mm and a thickness of 5 mm.

Both sides of the test piece 11 is applied with a pressure-sensitive adhesive ("chemical reaction-type adhesive: Quick bond F9" manufactured by Kansai Polymer Research Institute), and the wood plate 12 and wood plate 13 are laminated and fixed on the both sides of the test piece 11. At this time, as shown in FIG. 1, the wood plate 12 and the wood plate 13 are laminated and fixed on both sides of the test piece 11 such that the one end side 12a of the wood plate 12 and one end side 13a of the wood plate 13 are disposed thereon as well as that the other end sides 12b and 13b of the wood plates are apart from each other.

Next, application of a pressure for 10 seconds by placing a 5 kg weight on the one end side 12a of the wood plate 12 followed by allowing to stand at 23° C. for 24 hours results in a specimen for measurement of the low-speed shear modulus.

With the other end side 12b of the wood plate 12 of the specimen for measurement prepared described above fixed, the other end side 13b of the wood plate 13 is pulled in the shear direction (the arrow direction in FIG. 1) under conditions of 100 mm/min at 23° C. with a tensile tester. The initial slope of the resulting stress-strain curve is defined as the low-speed shear modulus of the present invention.

25% Compressive strength

The 25% compressive strength of the multilayer foam sheet according to the first embodiment of the present invention is 125 kPa or less. When the 25% compressive strength of the multilayer foam sheet is larger than 125 kPa, the flexibility will be insufficient, and functions as a foam sheet are degraded. From such a viewpoint, the 25% compressive strength of the multilayer foam sheet is preferably 110 kPa or less, more preferably 100 kPa or less, and further preferably 90 kPa or less. The lower limit value of the range of the 25% compressive strength of the foam sheet of the present invention is not particularly limited and is 20 kPa, for example. The 25% compressive strength of the multilayer foam sheet can be measured by the method described in an example described below.

Tensile Strength at Break

The tensile strength at break of the multilayer foam sheet according to the first embodiment of the present invention is preferably 10 N/10 mm or more. When the tensile strength at break is 10 N/10 mm or more, the mechanical strength in the shear direction of the multilayer foam sheet is more likely to be enhanced. From such a viewpoint, the tensile strength at break of the multilayer foam sheet is more preferably 15 N/10 mm or more and further preferably 20 N/10 mm or more. The tensile strength at break of the multilayer foam sheet is the tensile strength at break in the machine direction (MD) and can be measured by the method described in an example described below.

Density

The density of the multilayer foam sheet according to the first embodiment of the present invention is preferably from 0.07 to 0.22 g/cm$^3$, more preferably from 0.10 to 0.21 g/cm$^3$ and further preferably from 0.13 to 0.20 g/cm$^3$. When the density of the multilayer foam sheet is in these ranges, the 25% compressive strength described above is more likely to be adjusted to a desired value. The density here means an apparent density, which is a value measured in accordance with JIS K7222 (2005).

Expansion Ratio

The expansion ratio of the base layer comprising a foam layer in the multilayer foam sheet according to the first embodiment of the present invention is preferably from 3 to 40, more preferably from 5 to 30, and further preferably from 7 to 25. When the expansion ratio of the base layer is set to be equivalent to or higher than these lower limit values, the flexibility of the foam sheet is enhanced, and when the expansion ratio is set to be equivalent to or lower than these upper limit values, the mechanical strength in the shear direction of the foam sheet increases.

When the surface layer is a foam layer, the expansion ratio of the foam layer is preferably from 1.2 to 10, more preferably from 1.3 to 8, and further preferably from 1.4 to 6. When the expansion ratio of the foam layer of the surface is set to be equivalent to or higher than these lower limit values, the flexibility of the foam sheet is enhanced, and when the expansion ratio is set to be equivalent to or lower than these upper limit values, the mechanical strength in the shear direction of the foam sheet increases.

The expansion ratio can be measured by the method described in an example.

The expansion ratio of the multilayer foam sheet according to the first embodiment of the present invention (the expansion ratio of the entire sheet) is preferably from 2 to 20, more preferably from 3 to 15, and further preferably from 4 to 10.

In the multilayer foam sheet according to the first embodiment of the present invention, it is preferable that the expansion ratio of the base layer be adjusted within the ranges described above as well as the expansion ratio of the foam layer of the surface layer be adjusted within the ranges described above, from the viewpoint of obtaining a multilayer foam sheet excellent both in flexibility and mechanical strength in the shear direction.

It is also preferable to make the expansion ratio of the foam layer of the surface layer lower than the expansion ratio of the base layer. In the case of a multilayer foam sheet comprising the foam layer on both sides of the base layer, the expansion ratio of the foam layer on at least one side is preferably lower than the expansion ratio of the base layer, and the expansion ratio of both the foam layers on both sides is more preferably lower than the expansion ratio of the base layer. When the expansion ratio is adjusted in this manner, a multilayer foam sheet excellent in flexibility and mechanical strength in the shear direction is more likely to be obtained.

Thickness

The thickness of the multilayer foam sheet according to the first embodiment of the present invention is not particularly limited and is preferably from 30 to 2000 µm, more preferably from 100 to 1700 µm, and further preferably from 200 to 1300 µm. When the thickness is within these ranges, the sheet is more likely to be used in a thin electronic device, and appropriate flexibility and mechanical strength in the shear direction are more likely to be achieved.

The thickness of the base layer and the thickness of the surface layer are preferably as described below, from the viewpoint of making the flexibility and mechanical strength in the shear direction satisfactory.

The thickness of the base layer in the multilayer foam sheet according to the first embodiment of the present invention is not particularly limited and is preferably from 20 to 1400 µm, more preferably from 80 to 1200 µm, and further preferably from 170 to 1000 µm.

The thickness of the surface layer in the multilayer foam sheet according to the first embodiment of the present invention is not particularly limited and is preferably from 5 to 300 µm, more preferably from 10 to 250 µm, and further preferably from 15 to 150 µm. In the case of a multilayer foam sheet comprising a surface layer on both sides of the base layer, it is preferable that the thickness of at least one of, preferably both the surface layers be within the above ranges.

In the multilayer foam sheet according to the first embodiment of the present invention, both the thickness of the base layer and the thickness of the surface layer are preferably within the ranges described above, from the viewpoint of making the flexibility and mechanical strength in the shear direction of the multilayer foam sheet excellent.

From the similar viewpoint, the ratio of the thickness of the base layer to the thickness of the surface layer (thickness of base layer/thickness of surface layer) is preferably 2.0 or more, more preferably 3.0 or more, further preferably 4.0 or more, further preferably 5.0 or more, and preferably 30 or less. In the case of a multilayer foam sheet comprising a surface layer on both sides of the base layer, the thickness of the surface layer on determining the above ratio of the thicknesses is the average value of the thicknesses of both the surface layers.

Gel Fraction

The gel fraction of the multilayer foam sheet according to the first embodiment of the present invention is preferably from 30 to 80% by mass. When the gel fraction of the foam sheet is from 30 to 80% by mass, the flexibility and the mechanical strength in the shear direction of the foam sheet are more likely to be satisfactory. From such a viewpoint, the gel fraction of the multilayer foam sheet is more preferably 32 to 70% by mass and further preferably 33 to 65% by mass. The gel fraction of the multilayer foam sheet can be measured by the method described in an example.

Average Cell Diameter

The average cell diameter of the base layer of the multilayer foam sheet according to the first embodiment of the present invention is preferably from 20 to 500 µm. When the average cell diameter is within the above range, the low-speed shear modulus is more likely to be adjusted within the desired range described above, and the mechanical strength in the shear direction of the foam sheet is enhanced.

From the above viewpoint, the average cell diameter is more preferably from 30 to 400 μm and further preferably from 40 to 300 μm.

The average cell diameter in the present invention is the larger value of the average value of the cell diameter in the machine direction (MD: machine direction) and the average value of the cell diameter in the direction perpendicular to the MD (TD: transverse direction).

The average cell diameter can be measured by the method described in an example.

Closed Cell Ratio

The closed cell ratio of the multilayer foam sheet according to the first embodiment of the present invention is preferably 90% or more. When the closed cell ratio is 90% or more, the mechanical strength in the shear direction and the flexibility can be made satisfactory. From the above viewpoint, the closed cell ratio of the foam sheet is further preferably 92% or more. The closed cell ratio is preferably as high as possible and may be 100% or less.

The closed cell ratio can be measured by the method described in an example.

Hereinafter, the base layer and surface layer comprising a foam layer will be described in more detail.

<Base Layer (Foam Layer)>

The base layer in the multilayer foam sheet according to the first embodiment of the present invention comprises a foam layer. Examples of types of resins constituting the base layer include, but are not particularly limited to, olefinic thermoplastic resins, acrylic resins, polyurethane-based resins, and thermoplastic elastomers. These may be used singly or in combination of two or more. The base layer preferably includes at least one resin selected from the group consisting of olefinic thermoplastic resins and thermoplastic elastomers and more preferably includes an olefinic thermoplastic resin. When an olefinic thermoplastic resin or thermoplastic elastomer is used, the flexibility, mechanical strength, and the like of the base layer are more likely to be achieved while the foaming property and the like are made satisfactory. The resins to be used in the base layer may be used singly or in combination of two or more.

Specific examples of the olefinic thermoplastic resins include polyethylene resins, polypropylene resins, and ethylene-vinyl acetate copolymers, and polyethylene resins are preferable among these.

Examples of the polyethylene resins include polyethylene resins obtained by polymerization with a polymerization catalyst such as a Ziegler-Natta compound, a metallocene catalyst, or a chromium oxide compound, and a polyethylene resin obtained by polymerization with a metallocene catalyst is preferably used.

Metallocene Catalyst

Examples of the metallocene catalyst include compounds such as a bis(cyclopentadienyl) metal complex having a structure in which transition metal is interposed between π-electron system unsaturated compounds. More specific examples include compounds in which 1 or 2 or more cyclopentadienyl rings or analogues thereof are present as ligands on tetravalent transition metal such as titanium, zirconium, nickel, palladium, hafnium, and platinum.

In these metallocene catalysts, active sites have uniform properties, and each of the active sites has the same activity. A polymer synthesized using a metallocene catalyst has high uniformity in molecular weight, molecular weight distribution, composition, compositional distribution, and the like. Thus, when a sheet including a polymer synthesized using a metallocene catalyst is crosslinked, the crosslinking proceeds uniformly. The uniformly crosslinked sheet is foamed uniformly and thus more likely to stabilize its physical properties. Additionally, the sheet can be stretched uniformly, and thus the thickness of the foam can be uniform.

Examples of the ligands include cyclopentadienyl rings and indenyl rings. These cyclic compounds may be substituted with a hydrocarbon group, a substituted hydrocarbon group, or a hydrocarbon-substituted metalloid group. Examples of the hydrocarbon group include a methyl group, an ethyl group, various propyl groups, various butyl groups, various amyl groups, various hexyl groups, a 2-ethylhexyl group, various heptyl groups, various octyl groups, various nonyl groups, various decyl groups, various cetyl groups, and a phenyl group. The term "various" means various isomers including n-, sec-, tert-, and iso-.

An oligomer obtained by polymerizing a cyclic compound may be used as a ligand.

In addition to π-electron system unsaturated compounds, monovalent anionic ligands of chlorine, bromine, or the like or divalent anionic chelate ligands, hydrocarbons, alkoxides, arylamides, aryloxides, amides, arylamides, phosphides, and arylphosphides further may be used.

Examples of metallocene catalysts containing tetravalent transition metal or a ligand include cyclopentadienyl titanium tris(dimethylamide), methylcyclopentadienyl titanium tris(dimethylamide), bis(cyclopentadienyl) titanium dichloride, and dimethylsilyl tetramethylcyclopentadienyl-t-butylamide zirconium dichloride.

The metallocene catalyst, when in combined with a specific cocatalyst (promoter), exerts a catalytic effect on polymerizing various olefins. Specific examples of the cocatalyst include methyl aluminoxane (MAO) and boron-based compounds. The ratio of the cocatalyst to be used with respect to the metallocene catalyst is preferably from 10 to 1,000,000 molar times and more preferably from 50 to 5,000 molar times.

As the polyethylene resin, a linear low-density polyethylene is preferable. The linear low-density polyethylene is more preferably a linear low-density polyethylene obtained by copolymerizing ethylene (e.g., 75% by mass or more and preferably 90% by mass or more based on the total monomer amount) and a small amount of an α-olefin as required. Specific examples of the α-olefin include propylene, 1-butene, 1-pentene, 4-methyl-1-pentene, 1-hexene, 1-heptene, and 1-octene. Among these, α-olefins having 4 to 10 carbon atoms are preferable.

The density of the polyethylene resin, for example, the linear low-density polyethylene described above is preferably from 0.870 to 0.925 $g/cm^3$, more preferably from 0.890 to 0.925 $g/cm^3$, and further preferably from 0.910 to 0.925 $g/cm^3$, from the viewpoint of flexibility. As the polyethylene resin, a plurality of polyethylene resins also can be used, and a polyethylene resin having a density out of the density range described above may be added.

Examples of the ethylene-vinyl acetate copolymer to be used as the olefinic thermoplastic resin include an ethylene-vinyl acetate copolymer containing 50% by mass or more of ethylene.

Examples of the polypropylene resin include homopolypropylene and propylene-α-olefin copolymers containing 50% by mass or more of propylene. These may be used singly or in combination of two or more. Specific examples of the α-olefin constituting the propylene-α-olefin copolymer can include ethylene, 1-butene, 1-pentene, 4-methyl-1- pentene, 1-hexene, 1-heptene, and 1-octene, and among these, an α-olefin having 6 to 12 carbon atoms is preferable.

Examples of the thermoplastic elastomer include olefinic thermoplastic elastomers, styrenic thermoplastic elastomers, vinyl chloride-based thermoplastic elastomers, polyurethane-based thermoplastic elastomers, polyester-based thermoplastic elastomers, and polyamide-based thermoplastic elastomers. As the thermoplastic elastomer, these components may be used singly or in combination of two or more.

Among these, olefinic thermoplastic elastomers and styrenic thermoplastic elastomers are preferable, and styrenic thermoplastic elastomers are more preferable.

Examples of the olefinic thermoplastic elastomer include blended, dynamic crosslinked, and polymerized olefinic thermoplastic elastomers, and more specific examples include thermoplastic elastomers in which a thermoplastic crystalline polyolefin such as polypropylene or polyethylene is used as a hard segment and fully vulcanized or partially vulcanized rubber is used as a soft segment.

Examples of the thermoplastic crystalline polyolefin include a homopolymer of an α-olefin having 1 to 4 carbon atoms or a copolymer of 2 or more α-olefins, and polyethylene or polypropylene is preferable. Example of a soft segment component include butyl rubber, halobutyl rubber, EPDM, EPM, acrylonitrile/butadiene rubber, NBR, and natural rubber, and among these, EPDM is preferable.

Examples of the olefinic thermoplastic elastomer also include block copolymer types. Examples of the block copolymer types include those having crystalline blocks and soft segment blocks, and more specific examples include crystalline olefin block-ethylenebutylene copolymer-crystalline olefin block copolymers (CEBCs). In a CEBC, the crystalline olefin block is preferably a crystalline ethylene block, and examples of such commercially available CEBC products include "DYNARON 6200P" manufactured by JSR Corporation.

Examples of the styrenic thermoplastic elastomer include block copolymers having a polymer or copolymer block of styrene and a polymer or copolymer block of a conjugated diene compound. Examples of the conjugated diene compound include isoprene and butadiene.

The styrenic thermoplastic elastomer to be used in the present invention may be or may not be hydrogenated. When the elastomer is hydrogenated, the hydrogenation can be performed by a known method.

The styrenic thermoplastic elastomer is usually a block copolymer, and examples thereof include styrene-isoprene block copolymers, styrene-isoprene-styrene block copolymers, styrene-butadiene block copolymers, styrene-butadiene-styrene block copolymers, styrene-ethylene/butylene-styrene block copolymers (SEBSs), styrene-ethylene/propylene-styrene block copolymers (SEPSs), styrene-ethylene/butylene block copolymers (SEBs), styrene-ethylene/propylene block copolymers (SEPs), and styrene-ethylene/butylene-crystalline olefin block copolymers (SEBCs).

As the styrenic thermoplastic elastomers described above, block copolymers are preferable, and in particular, SEBSs and SEBCs are more preferable.

Examples of commercially available products of the styrenic thermoplastic elastomer include product name "DYNARON 8600P" (styrene content: 15% by mass), product name "DYNARON 4600P" (styrene content: 20% by mass), and product name "DYNARON 1321P" (styrene content: 10% by mass) manufactured by JSR Corporation, and product name "HYBRAR 7311" manufactured by Kuraray Co., Ltd.

[Additives]

The base layer comprising a foam layer used in the present invention can be preferably obtained by foaming a formable resin composition including the above resin and a foaming agent. The foaming agent is preferably a thermally decomposable foaming agent.

As the thermally decomposable foaming agent, organic foaming agents and inorganic foaming agents can be used. Examples of organic foaming agents include azo compounds such as azodicarbonamide, metal salts of azodicarboxylic acid (such as barium azodicarboxylate), and azobisisobutyronitrile, nitroso compounds such as N,N'-dinitrosopentamethylenetetramine, hydrazine derivatives such as hydrazodicarbonamide, 4,4'-oxybis(benzenesulfonylhydrazide), and toluenesulfonylhydrazide, and semicarbazide compounds such as toluene sulfonyl semicarbazide.

Examples of inorganic foaming agents include ammonium carbonate, sodium carbonate, ammonium hydrogen carbonate, sodium hydrogen carbonate, ammonium nitrite, sodium borohydride, and anhydrous monosodium citrate.

Among these, from the viewpoint of obtaining fine cells and from the viewpoint of economic efficiency and safety, azo compounds are preferable, and azodicarbonamide is more preferable.

The thermally decomposable foaming agents may be used singly or in combination of two or more.

The amount of the foaming agent compounded into the expandable resin composition for forming the base layer is preferably from 1 to 20 parts by mass, more preferably from 3 to 15 parts by mass, and further preferably from 5 to 10 parts by mass based on 100 parts by mass of the resin. When the amount of the foaming agent compounded is set to 1 part by mass or more, certain flexibility can be imparted to the foam sheet. When the amount of the foaming agent compounded is set to 20 parts by mass or less, the foam layer is prevented from unnecessarily foaming, and the mechanical strength and the like of the foam layer can be made satisfactory.

A decomposition temperature modifier may be compounded in the expandable resin composition. A decomposition temperature modifier is compounded to lower the decomposition temperature of the thermally decomposable foaming agent or to enhance or adjust the decomposition speed thereof, and examples of specific compounds include zinc oxide, zinc stearate, and urea. For example, 0.01 to 5 parts by mass of the decomposition temperature modifier is compounded based on 100 parts by mass of the resin, for adjusting the surface state and the like of the foam layer.

An antioxidant may be compounded in the expandable resin composition. Examples of the antioxidant include phenol-based antioxidants such as 2,6-di-t-butyl-p-cresol, sulfur-based antioxidants, phosphorus-based antioxidants, and amine-based antioxidants. For example, 0.01 to 5 parts by mass of the antioxidant are compounded based on 100 parts by mass of the resin.

In the base layer, the resin is the main component, and the content of the resin is, for example, 70% by mass or more, preferably 80% by mass or more, and more preferably 90% by mass or more based on the total amount of the foam layer.

The expandable resin composition may contain additives generally used in foams such a heat stabilizer, a coloring agent, a fire retardant, an antistatic agent, and a filler as required, in addition to those described above.

<Surface Layer>

The surface layer is laminated on at least one side of the base layer. That is, the surface layer may be laminated on one side of the base layer or may be laminated on both sides of the base layer. In particular, in the viewpoint of making the reworkability satisfactory or in the case of disposition inside an electronic device or the like, from the viewpoint of not markedly changing the mechanical strength in the shear direction in accordance with the disposition manner or the like, the surface layer is preferably laminated on both sides of the base layer.

The surface layer is a layer comprising a foam layer or a resin film. The resin film is a resin layer of a non-foam. First, a case in which the surface layer is a resin film will be described.

In the surface layer, types of the resin constituting the resin film are not particularly limited. Examples of the resin constituting the resin film include olefinic thermoplastic resins, acrylic resins, polyurethane-based resins, and thermoplastic elastomers, similarly as the resin of the above base layer. Besides these, silicone-based resins, vinyl chloride-based resins, styrenic resins, polyester-based resins, polyamide-based resins, and ionomer-based resins also may be used.

In the surface layer, the resins may be used singly or in combination of two or more. When the surface layer is laminated on both sides of the foam layer, the resins each used in the 2 surface layers may be a resin of the same type to each other or may be different resins. From the viewpoint of productivity and from the viewpoint that both the layers are easily allowed to have the same or similar physical properties, the resins are preferably of the same type to each other.

The resin constituting the surface layer is preferably a thermoplastic resin, and use of a thermoplastic resin enables the surface layer to easily adhere on the base layer.

The resin to be used in each of the surface layers is preferably an olefinic thermoplastic resin among those described above. Use of an olefinic thermoplastic resin allows the mechanical strength in the shear direction of the foam sheet to be easily enhanced. In the case where an olefinic thermoplastic resin or a thermoplastic elastomer is used in the base layer, adhesiveness of the surface layer to the foam layer can be particularly satisfactory.

Examples of the olefinic thermoplastic resin include polyethylene resins and polypropylene resins. The olefinic thermoplastic resin also may be an ethylene-vinyl acetate copolymer, an ethylene-ethyl acrylate copolymer, or the like.

Examples of the polyethylene resin include low-density polyethylene (density: less than 0.930 $g/cm^3$), medium-density polyethylene (density: 0.930 $g/cm^3$ or more and less than 0.942 $g/cm^3$), and high-density polyethylene (density: 0.942 $g/cm^3$ or more).

Examples of the low-density polyethylene here preferably include linear low-density polyethylene. The details of the linear low-density polyethylene are as described in the description of the base layer, and thus the details thereof are omitted. The details of the polypropylene resin are also as described in the description of the base layer, and thus the details thereof are omitted.

Examples of the ethylene-vinyl acetate copolymer to be used in the surface layer include an ethylene-vinyl acetate copolymer containing 50% by mass or more of a constituent unit derived from ethylene.

Examples of the ethylene-ethyl acrylate copolymer include an ethylene-ethyl acrylate copolymer containing 50% by mass or more of a constituent unit derived from ethylene.

Among those described above, from the viewpoint of adhesiveness to the foam layer, bending stress, and tensile strength, an ethylene resin, particularly, linear low-density polyethylene is preferable. From the similar viewpoint, ethylene-vinyl acetate copolymers are also preferable.

In the surface layer, the resin is the main component, and the content of the resin is, for example, 70% by mass or more, preferably 80% by mass or more, and more preferably 90% by mass or more based on the total amount of the respective layers. The surface layer may contain additives such as an antioxidant, a heat stabilizer, a coloring agent, a fire retardant, an antistatic agent, and a filler, besides the above resin.

The surface layer may be crosslinked. The surface layer may be crosslinked in conjunction with crosslinking of the base layer, as described in the production method 1 mentioned below. Accordingly, the surface layer is preferably crosslinked with ionizing radiation.

The surface layer is preferably a layer comprising a foam as described above. In the case where a foam layer is used as the surface layer, for example, an expandable resin composition may be foamed into which a foaming agent and the like are compounded, as described for the base layer, in a resin that can be used in the surface layer described above. The amount of the foaming agent compounded into the expandable resin composition for forming the surface layer is preferably from 0.1 to 10 parts by mass, more preferably from 0.5 to 5 parts by mass, and further preferably from 1 to 3 parts by mass based on 100 parts by mass of the resin. When the amount of the foaming agent is within these ranges, the expansion ratio of the surface layer is more likely to be adjusted within the desired ranges described above.

Adhesive Layer

In the first embodiment of the present invention, the base layer and the surface layer may be laminated directly or may be laminated with another layer interposed therebetween. Examples of another layer include an adhesive layer. As the adhesive layer, a known adhesive, a pressure-sensitive adhesive, or the like may be used. The adhesive layer also may be pressure-sensitive adhesive double coated tape or the like including a pressure-sensitive adhesive layer provided on both sides of the base material.

The adhesive layer may be thick enough not to markedly affect the physical properties such as mechanical strength and flexibility in the multilayer foam sheet. Accordingly, the thickness of the adhesive layer to bond the base layer and the surface layer to each other is preferably smaller than that of the surface layer and more preferably equal to or smaller than one-half of that of the surface layer.

<Method for Producing Foam Sheet>

Production Method 1

The multilayer foam sheet according to the first embodiment of the present invention can be produced by, for example, a method in which a plurality of layers comprising a resin composition are laminated to obtain a multilayer laminate sheet, and then, the multilayer laminate sheet is foamed to obtain the multilayer foam sheet (hereinafter, also referred to as the "production method 1"), but are not particularly limited thereto. The term "resin composition" herein also includes a case in which the composition comprises one resin singly as a concept.

The production method 1 more specifically includes the following steps I to II:
 (I) a step of obtaining a multilayer laminate sheet comprising a layer comprising an expandable resin composition and a surface layer formed on one side or both sides of the layer, and (II) a step of foaming the layer comprising the expandable resin composition of the multilayer laminate sheet to obtain a foam sheet.

Hereinafter, each of the steps will be described.

Step (I)

In the step (I), as the method for obtaining a multilayer laminate sheet, coextrusion is preferably performed, but are not limited thereto.

Specifically, in the case where a surface layer is formed on both sides of a layer comprising an expandable resin composition, a resin for forming the surface layer and other additives to be compounded as required are fed respectively to a first extruder and a third extruder and melt-kneaded to obtain a resin composition for forming the surface layer. Additionally, a resin for forming the base layer, a foaming agent such as a thermally decomposable foaming agent, and additives to be compounded as required are fed to a second extruder and melt-kneaded to obtain an expandable resin composition for forming the base layer.

Next, the resin compositions fed from the first to third extruders are combined with the composition fed from the second extruder such that the composition fed from the second extruder is to be a medium layer, the compositions are extruded via a T-die or the like into a sheet form, and thus a multilayer laminate sheet having a three-layer structure can be obtained.

In the case where a surface layer is formed on one side of a layer comprising an expandable resin composition, a resin for forming the surface layer and other additives to be compounded as required are fed to a first extruder and melt-kneaded to obtain a resin composition for forming the surface layer. Additionally, a resin for forming the base layer, a foaming agent such as a thermally decomposable foaming agent, and additives to be compounded as required are fed to a second extruder and melt-kneaded to obtain an expandable resin composition for forming the base layer.

Next, the resin compositions fed from the first extruder is combined with the composition fed from the second extruder, the compositions are extruded via a T-die or the like into a sheet form, and thus a multilayer laminate sheet having a two-layer structure can be obtained. In coextrusion, either of a feed block method or a multi-manifold method is acceptable, but the feed block method is preferable.

In the step (I), the multilayer laminate sheet obtained above is preferably further crosslinked. As a crosslinking method, a method in which an organic peroxide is compounded in advance and the multilayer laminate sheet obtained in the step (I) is crosslinked by heating is included, but the multilayer laminate sheet is preferably crosslinked by irradiation with ionizing radiation. Examples of the ionizing radiation include electron beams and β-rays, but electron beams are preferable.

An irradiation dose of the ionizing radiation is preferably from 1 to 10 Mrad and more preferably from 1.5 to 5 Mrad.

Step (II)

In the step (II), the multilayer laminate sheet obtained in the step (I) is subjected to a foaming treatment to foam the layer comprising the expandable resin composition. The layer comprising the expandable resin composition may be treated such that the foaming agent is foamed. In the case where the foaming agent is a thermally decomposable foaming agent, the layer is foamed by heating the multilayer laminate sheet. The heating temperature may be a temperature equal to or higher than the temperature at which the thermally decomposable foaming agent decomposes, and is from approximately 150 to 320° C., for example.

Examples of a method for heating the multilayer laminate sheet include, but are not particularly limited to, a method of heating the multilayer laminate sheet with hot air, a method of heating with infrared, a method of heating with a salt bath, and a method of heating with an oil bath, and these methods may be used in combination.

The multilayer laminate sheet may be stretched or the like as appropriate during or after foamed.

In the description above, an example of the case where the surface layer is a resin film (non-foam) has been described. In the case where the surface layer is a foam, a foaming agent such as a thermally decomposable foaming agent is compounded as an additive also in the resin composition for forming the surface layer, and foaming may be performed in the step (II).

Second Production Method

The production method of the multilayer foam sheet according to the first embodiment of the present invention can be produced by a different method. Specific examples thereof include a method in which a foam layer to compose the base layer is produced in advance, and a resin film or a foam layer composing the surface layer is superposed on one side or both sides of the foam layer and bonded thereto (also referred to as the "second production method").

As a method to obtain a foam in the second production method, a resin for forming the base layer, a thermally decomposable foaming agent, and additives to be compounded as required are melt-kneaded to obtain an expandable resin composition for forming a base layer, and the expandable resin composition may be molded into a sheet form (expandable resin composition sheet). The method in which the expandable resin composition is melt-kneaded and molded into a sheet form is preferably performed by using an extruder, but is not particularly limited thereto.

The resulting expandable resin composition sheet is preferably further crosslinked before the foaming described below. As a crosslinking method, a method in which an organic peroxide is compounded in advance and the expandable resin composition sheet is crosslinked by heating is included, but the expandable resin composition sheet is preferably crosslinked by irradiation with ionizing radiation. The type and irradiation dose of the ionizing radiation are as described in the first production method described above.

Next, the expandable resin composition sheet may be foamed. The layer comprising the expandable resin composition may be treated such that the foaming agent is foamed. In the case where the foaming agent is a thermally decomposable foaming agent, the layer is foamed by heating the multilayer laminate sheet. The heating temperature and heating method are as described in the first production method described above. The expandable resin composition sheet may be stretched or the like as appropriate during or after foamed.

Thereafter, a resin film or a foam, separately provided, for constituting the surface layer, is superposed on one side or both sides of the foam layer composing the base layer and bonded thereto, and thus a multilayer foam sheet can be obtained. Specifically, the layers may be thermocompression-bonded by heating and compression with a press or the like. Alternatively, the layers may be attached to each other with a pressure-sensitive adhesive, an adhesive, pressure-sensitive adhesive double coated tape, or the like by applying a pressure-sensitive adhesive, an adhesive, or the like on the adhesion face between the foam layer and the surface layer or by attaching pressure-sensitive adhesive double coated tape thereto.

[Pressure-Sensitive Adhesive Tape]

The multilayer foam sheet according to the first embodiment of the present invention may be used in pressure-sensitive adhesive tape including a multilayer foam sheet as the base material. The pressure-sensitive adhesive tape comprises, for example, a multilayer foam sheet and a pressure-sensitive adhesive material provided on at least one side of the multilayer foam sheet. The pressure-sensitive adhesive tape is enabled to adhere to other members through the pressure-sensitive adhesive material. The pressure-sensitive adhesive tape may be one including the pressure-sensitive adhesive material provided on both sides of the multilayer foam sheet or may be one including the pressure-sensitive adhesive material provided on one side of the multilayer foam sheet.

The pressure-sensitive adhesive material may be one comprising at least a pressure-sensitive adhesive layer, may be a single pressure-sensitive adhesive layer laminated on the surface of the multilayer foam sheet, or may be a pressure-sensitive adhesive double coated sheet attached to the surface of the multilayer foam sheet, but is preferably a single pressure-sensitive adhesive layer. The pressure-sensitive adhesive double coated sheet comprises a base material and a pressure-sensitive adhesive layer provided on both sides of the base material. The pressure-sensitive adhesive double coated sheet is used for allowing one pressure-sensitive adhesive layer to adhere to the multilayer foam sheet as well as for allowing the other pressure-sensitive adhesive layer to adhere to other members.

Examples of the pressure-sensitive adhesive constituting the pressure-sensitive adhesive layer that can be used include, but are not particularly limited to, acrylic pressure-sensitive adhesives, urethane-based pressure-sensitive adhesives, and rubber-based pressure-sensitive adhesives. Additionally, a release sheet such as release paper may be further attached on the pressure-sensitive adhesive material.

The thickness of the pressure-sensitive adhesive material is preferably from 5 to 200 μm, more preferably from 7 to 150 μm, and further preferably from 10 to 100 μm.

[Applications]

The multilayer foam sheet according to the first embodiment of the present invention, and pressure-sensitive adhesive tape comprising the multilayer foam sheet are preferably used, for example, inside electronic devices, but are not limited thereto, and are disposed, for example, between 2 members for use as an impact absorbing material, a sealing material, or the like.

Examples of electronic devices include mobile phones, cameras, displays, gaming devices, electronic organizers, and personal computers.

The multilayer foam sheet of the present invention and pressure-sensitive adhesive tape comprising the same are excellent in mechanical strength in the shear direction while having high flexibility, as described above. For this reason, the multilayer foam sheet and pressure-sensitive adhesive tape comprising the same are preferably used particularly in a large display and specifically preferably used in a 20-inch or larger display. The display may be a liquid-crystal display or may be an organic EL display.

Second Embodiment

[Foam Sheet]

A multilayer foam sheet according to the second embodiment of the present invention is a multilayer foam sheet comprising a base layer comprising a foam layer and a surface layer comprising a foam layer or a resin film and laminated on at least one side of the base layer, wherein the 25% compressive strength is 125 kPa or less, and the tensile strength at break is from 10 N/10 mm to 700 N/10 mm. This allows the multilayer foam sheet to be excellent in level-difference conformability and reworkability. From the viewpoint of further improving the level-difference conformability, the surface layer is preferably a foam layer.

25% Compressive Strength

The 25% compressive strength of the multilayer foam sheet according to the second embodiment of the present invention is 125 kPa or less. When the 25% compressive strength of the multilayer foam sheet is larger than 125 kPa, the level-difference conformability of the multilayer foam sheet is degraded. From such a viewpoint, the 25% compressive strength of the multilayer foam sheet is preferably 110 kPa or less, more preferably 100 kPa or less, and further preferably 90 kPa or less. The lower limit value of the range of the 25% compressive strength of the foam sheet of the present invention is not particularly limited and is 20 kPa, for example. The 25% compressive strength of the multilayer foam sheet can be measured by the method described in an example described below.

Tensile Strength at Break

The tensile strength at break of the multilayer foam sheet according to the second embodiment of the present invention is from 10 to 700 N/10 mm. When the tensile strength at break is less than 10 N/10 mm, the multilayer foam sheet may be broken during reworking, and consequently the reworkability is degraded. When the tensile strength at break is large than 700 N/10 mm, the flexibility of the multilayer foam sheet is degraded, and consequently the level-difference conformability is degraded. From such a viewpoint, the tensile strength at break of the multilayer foam sheet is preferably from 15 to 500 N/10 mm and more preferably from 20 to 80 N/10 mm. The tensile strength at break of the multilayer foam sheet is the tensile strength at break in the machine direction (MD) and can be measured by the method described in an example described below.

Density

The density of the multilayer foam sheet according to the second embodiment of the present invention is preferably from 0.07 to 0.22 $g/cm^3$, more preferably from 0.10 to 0.21 $g/cm^3$, and further preferably from 0.13 to 0.20 $g/cm^3$. When the density of the multilayer foam sheet is in these ranges, the 25% compressive strength described above is more likely to be adjusted to a desired value. The density here means an apparent density, which is a value measured in accordance with JIS K7222 (2005).

Expansion Ratio

The expansion ratio of the base layer comprising a foam layer in the multilayer foam sheet according to the second embodiment of the present invention is preferably from 3 to 40, more preferably from 5 to 30, and further preferably from 7 to 25. When the expansion ratio of the base layer is set to be equivalent to or higher than these lower limit values, the level-difference conformability of the foam sheet is enhanced, and when the expansion ratio is set to be equivalent to or lower than these upper limit values, the reworkability of the foam sheet is enhanced.

When the surface layer is a foam layer, the expansion ratio of the foam layer is preferably from 1.2 to 10, more preferably from 1.3 to 8, and further preferably from 1.4 to 6, and from the viewpoint of dustproofness and waterproofness, further preferably from 1.4 to 3. When the expansion ratio of the foam layer of the surface is set to be equivalent to or higher than these lower limit values, the flexibility of the foam sheet is enhanced to thereby improve the level-difference conformability, and when the expansion ratio is set to be equivalent to or lower than these upper limit values, the reworkability of the foam sheet is enhanced.

The expansion ratio can be measured by the method described in an example.

The expansion ratio of the multilayer foam sheet according to the second embodiment of the present invention (the expansion ratio of the entire sheet) is preferably from 2 to 20, more preferably from 3 to 15, and further preferably from 4 to 10.

In the multilayer foam sheet according to the second embodiment of the present invention, it is preferable that the expansion ratio of the base layer be adjusted within the ranges described above as well as the expansion ratio of the foam layer of the surface layer be adjusted within the ranges described above, from the viewpoint of obtaining a multilayer foam sheet excellent both in level-difference conformability and reworkability.

It is also preferable to make the expansion ratio of the foam layer of the surface layer lower than the expansion ratio of the base layer. In the case of a multilayer foam sheet comprising the foam layer on both sides of the base layer, the expansion ratio of the foam layer on at least one side is preferably lower than the expansion ratio of the base layer, and the expansion ratio of both the foam layers on both sides is more preferably lower than the expansion ratio of the base layer. When the expansion ratio is adjusted in this manner, a multilayer foam sheet excellent both in level-difference conformability and reworkability is more likely to be obtained.

Thickness

The thickness of the multilayer foam sheet according to the second embodiment of the present invention is not particularly limited and is preferably from 30 to 2000 μm, more preferably from 100 to 1700 μm, and further preferably from 200 to 1300 μm. When the thickness is within these ranges, the sheet is more likely to be used in a thin electronic device, and appropriate level-difference conformability and reworkability are more likely to be achieved.

The thickness of the base layer and the thickness of the surface layer are preferably as described below, from the viewpoint of making the level-difference conformability and reworkability satisfactory.

The thickness of the base layer in the multilayer foam sheet according to the second embodiment of the present invention is not particularly limited and is preferably from 20 to 1400 μm, more preferably from 80 to 1200 μm, and further preferably from 170 to 1000 μm.

The thickness of the surface layer in the multilayer foam sheet according to the second embodiment of the present invention is not particularly limited and is preferably from 5 to 300 μm, more preferably from 10 to 250 μm, and further preferably from 15 to 150 μm. In the case of a multilayer foam sheet comprising a surface layer on both sides of the base material, it is preferable that the thickness of at least one of, preferably both the surface layers be within the above ranges.

In the multilayer foam sheet according to the second embodiment of the present invention, both the thickness of the base layer and the thickness of the surface layer are preferably within the ranges described above, from the viewpoint of making the level-difference conformability and reworkability of the multilayer foam sheet excellent.

From the similar viewpoint, the ratio of the thickness of the base layer to the thickness of the surface layer (thickness of base layer/thickness of surface layer) is preferably 2.0 or more, more preferably 3.0 or more, further preferably 4.0 or more, further preferably 5.0 or more, and preferably 30 or less. In the case of a multilayer foam sheet comprising a surface layer on both sides of the base layer, the thickness of the surface layer on determining the above ratio of the thickness is the average value of the thickness of both the surface layers.

Gel Fraction

The gel fraction of the multilayer foam sheet according to the second embodiment of the present invention is preferably from 30 to 80% by mass. When the gel fraction of the foam sheet is from 30 to 80% by mass, the level-difference conformability and reworkability of the foam sheet are more likely to be satisfactory. From such a viewpoint, the gel fraction of the multilayer foam sheet is more preferably 32 to 70% by mass and further preferably 33 to 65% by mass. The gel fraction of the multilayer foam sheet can be measured by the method described in an example.

Average Cell Diameter

The average cell diameter of the base layer of the multilayer foam sheet according to the second embodiment of the present invention is preferably from 20 to 500 μm. When the average cell diameter is within the above range, the tensile strength at break is more likely to be adjusted within the desired range described above and the reworkability of the foam sheet is enhanced.

From the above viewpoint, the average cell diameter is more preferably from 30 to 400 μm and further preferably from 40 to 300 μm.

The average cell diameter in the present invention is the larger value of the average value of the cell diameter in the machine direction (MD: machine direction) and the average value of the cell diameter in the direction perpendicular to the MD (TD: transverse direction).

The average cell diameter can be measured by the method described in an example.

Closed Cell Ratio

The closed cell ratio of the multilayer foam sheet according to the second embodiment of the present invention is preferably 90% or more. When the closed cell ratio is 90% or more, the level-difference conformability and reworkability can be made satisfactory. From the above viewpoint, the closed cell ratio of the foam sheet is further preferably 92% or more. The closed cell ratio is preferably as high as possible and may be 100% or less.

The closed cell ratio can be measured by the method described in an example.

Hereinafter, the base material and surface layer comprising a foam layer will be described in more detail.

<Base Layer (Foam Layer)>

The base layer in the multilayer foam sheet according to the second embodiment of the present invention comprises a foam layer. Examples of types of resins constituting the base layer include, but are not particularly limited to, olefinic thermoplastic resins, acrylic resins, polyurethane-based resins, and thermoplastic elastomers. These may be used singly or in combination of two or more. The base layer preferably includes at least one resin selected from the group consisting of olefinic thermoplastic resins and thermoplastic elastomers and more preferably includes an olefinic thermoplastic resin. When an olefinic thermoplastic resin or thermoplastic elastomer is used, the flexibility, mechanical strength, and the like of the base layer are more likely to be achieved while the foaming property and the like are made satisfactory. The resins to be used in the base layer may be used singly or in combination of two or more.

As the resin and additives constituting the base layer in the multilayer foam sheet according to the second embodiment, ones similar to those of the multilayer foam sheet according to the first embodiment can be used.

<Surface Layer>

The surface layer is laminated on at least one side of the base layer. That is, the surface layer may be laminated on one side of the base layer or may be laminated on both sides of the base layer. Among these, from the viewpoint of improving the reworkability, the surface layer is preferably laminated on both sides of the base layer.

The surface layer is a layer comprising a foam layer or a resin film. The resin film is a resin layer of a non-foam.

As the resin constituting the surface layer in the multilayer foam sheet according to the second embodiment, one similar to that of the multilayer foam sheet according to the first embodiment can be used.

Adhesive Layer

In the second embodiment of the present invention, the base layer and the surface layer may be laminated directly or may be laminated with another layer interposed therebetween. Examples of another layer include an adhesive layer. As the adhesive layer, a known adhesive, pressure-sensitive adhesive, or the like may be used. The adhesive layer also may be pressure-sensitive adhesive double coated tape or the like including a pressure-sensitive adhesive layer provided on both sides of the base material.

The adhesive layer may be thick enough not to markedly affect the physical properties such as mechanical strength and flexibility in the multilayer foam sheet. Accordingly, the thickness of the adhesive layer to bond the base layer and the surface layer to each other is preferably smaller than that of the surface layer and more preferably equal to or smaller than one-half of that of the surface layer.

<Method for Producing Foam Sheet>

The multilayer foam sheet according to the second embodiment of the present invention can be produced by a production method similar to that of the multilayer foam sheet according to the first embodiment.

[Pressure-Sensitive Adhesive Tape]

The multilayer foam sheet according to the second embodiment of the present invention may be used in pressure-sensitive adhesive tape including a multilayer foam sheet as the base material. The pressure-sensitive adhesive tape comprises, for example, a multilayer foam sheet and a pressure-sensitive adhesive material provided on at least one side of the multilayer foam sheet. The pressure-sensitive adhesive tape is enabled to adhere to other members through the pressure-sensitive adhesive material. The pressure-sensitive adhesive tape may be one including the pressure-sensitive adhesive material provided on both sides of the multilayer foam sheet or may be one including the pressure-sensitive adhesive material provided on one side of the multilayer foam sheet, but one including the pressure-sensitive adhesive material provided on both sides is preferable.

The pressure-sensitive adhesive material may be one comprising at least a pressure-sensitive adhesive layer, may be a single pressure-sensitive adhesive layer laminated on the surface of the multilayer foam sheet, or may be a pressure-sensitive adhesive double coated sheet attached to the surface of the multilayer foam sheet, but is preferably a single pressure-sensitive adhesive layer. The pressure-sensitive adhesive double coated sheet comprises a base material and a pressure-sensitive adhesive layer provided on both sides of the base material. The pressure-sensitive adhesive double coated sheet is used for allowing one pressure-sensitive adhesive layer to adhere to the multilayer foam sheet as well as for allowing the other pressure-sensitive adhesive layer to adhere to other members.

Examples of the pressure-sensitive adhesive constituting the pressure-sensitive adhesive layer that can be used include, but are not particularly limited to, acrylic pressure-sensitive adhesives, urethane-based pressure-sensitive adhesives, and rubber-based pressure-sensitive adhesives. Additionally, a release sheet such as release paper may be further attached on the pressure-sensitive adhesive material.

The thickness of the pressure-sensitive adhesive material is preferably from 5 to 200 μm, more preferably from 7 to 150 μm, and further preferably from 10 to 100 μm.

[Applications]

The multilayer foam sheet according to the second embodiment of the present invention, and pressure-sensitive adhesive tape comprising the multilayer foam sheet are preferably used, for example, inside electronic devices, but are not limited thereto, and are disposed, for example, between 2 members for use as an impact absorbing material, a sealing material, or the like.

Examples of electronic devices include mobile phones, cameras, displays, gaming devices, electronic organizers, and personal computers.

The multilayer foam sheet according to the second embodiment of the present invention and pressure-sensitive adhesive tape comprising the same are excellent both in level-difference conformability and reworkability as described above. For this reason, the multilayer foam sheet and pressure-sensitive adhesive tape comprising the same are preferably used in a display, particularly in a large display and preferably used specifically in a 20-inch or larger display. The display may be a liquid-crystal display or may be an organic EL display. When the pressure-sensitive adhesive tape comprising the multilayer foam sheet is used in a display, the pressure-sensitive adhesive tape comprising the multilayer foam sheet is used in the back face or the frame of the display. Further, the pressure-sensitive adhesive tape of the present invention is excellent in level-difference conformability as described above. Thus, when the pressure-sensitive adhesive tape of the present invention is used in a display, the pressure-sensitive adhesive tape of the present invention can conform to a level difference in the housing of the display and, as a result, can reduce the area of a gap between the pressure-sensitive adhesive tape and the housing. Specifically, when the pressure-sensitive adhesive tape of the present invention is bonded to a predetermined adherend sample having a level difference in a predetermined method, the area of the gap between the level difference in the adherend and the pressure-sensitive adhesive tape is preferably from 0 to 3.0 cm² and more preferably from 0 to 2.0 cm². The predetermined adherend sample, a method for bonding the pressure-sensitive adhesive tape, and a method for measuring the area of the gap are as shown in examples.

In the case where the foam layer is provided on only one side of the base layer, it is preferable that the multilayer foam sheet is disposed such that the base layer is on the side of the level difference. With such an aspect, waterproofness and dustproofness between the adherend having a level difference and the multilayer foam sheet can be achieved.

Third Embodiment

[Foam Sheet]

The multilayer foam sheet according to the third embodiment of the present invention comprises a base layer comprising a foam layer or a resin film, and a surface layer comprising a foam layer or a resin film and laminated on at least one side of the base layer, wherein at least either of the base layer or the surface layer is a foam layer. The multilayer foam sheet according to the third embodiment of the present invention has a 25% compressive strength of 125 kPa or less and a moisture permeability of 15 g/m·24 hr or less. This allows the multilayer foam sheet to be excellent in gas sealability and level-difference conformability. From the viewpoint of further improving the level-difference conformability, the surface layer is preferably a foam layer.

25% Compressive Strength

The 25% compressive strength of the multilayer foam sheet according to the third embodiment of the present invention is 125 kPa or less. When the 25% compressive strength of the multilayer foam sheet is larger than 125 kPa, the level-difference conformability of the multilayer foam sheet is degraded. From such a viewpoint, the 25% compressive strength of the multilayer foam sheet is preferably 110 kPa or less, more preferably 100 kPa or less, and further preferably 90 kPa or less. The lower limit value of the range of the 25% compressive strength of the foam sheet of the present invention is not particularly limited and is 20 kPa, for example. The 25% compressive strength of the multilayer foam sheet can be measured by the method described in an example described below.

Moisture Permeability

The moisture permeability of the multilayer foam sheet according to the third embodiment of the present invention is 15 g/m·24 hr or less. When the moisture permeability is larger than 15 g/m·24 hr, the gas sealability of the multilayer foam sheet becomes insufficient. From such a viewpoint, the moisture permeability of the multilayer foam sheet is preferably 10 g/m·24 hr or less, more preferably 8 g/m·24 hr or less, and further preferably 5 g/m·24 hr or less. The lower limit value of the range of the moisture permeability of the foam sheet of the present invention is not particularly limited and is 2 g/m·24 hr, for example. The 25% compressive strength of the multilayer foam sheet can be measured by the method described in an example described below.

The moisture permeability can be within the ranges described above by adjusting the types of the resins of the layers, the closed cell ratio, the gel fraction, the presence or absence of foaming of the layers, the expansion ratio of the layers, the thickness of the layers, the average cell diameter, the crystallinity of the layers, and the like.

Density

The density of the multilayer foam sheet according to the third embodiment of the present invention is, for example, from 0.07 to 0.60 g/cm³, preferably from 0.09 to 0.50 g/cm³, more preferably from 0.11 to 0.40 g/cm³, and further preferably from 0.13 to 0.30 g/cm³. When the density of the multilayer foam sheet is in these ranges, the 25% compressive strength described above is more likely to be adjusted to a desired value. The density here means an apparent density, which is a value measured in accordance with JIS K7222 (2005).

Thickness

The thickness of the multilayer foam sheet according to the third embodiment of the present invention is not particularly limited and is preferably from 30 to 2000 μm, more preferably from 100 to 1700 μm, and further preferably from 200 to 1300 μm. When the thickness is within these ranges, the sheet is more likely to be used in a thin electronic device, and appropriate level-difference conformability and reworkability are more likely to be achieved.

The thickness of the base layer and the thickness of the surface layer are preferably as described below, from the viewpoint of making the gas sealability and level-difference conformability satisfactory.

The thickness of the base layer in the multilayer foam sheet according to the third embodiment of the present invention is not particularly limited and is preferably from 20 to 1,400 μm, more preferably from 40 to 1,200 μm, and further preferably from 80 to 1,000 μm.

The thickness of the surface layer in the multilayer foam sheet according to the third embodiment of the present invention is not particularly limited and is preferably from 5 to 300 μm, more preferably from 10 to 250 μm, and further preferably from 15 to 150 μm. In the case of a multilayer foam sheet comprising a surface layer on both sides of the base material, it is preferable that the thickness of at least one of, preferably both the surface layers be within the above ranges.

In the multilayer foam sheet according to the third embodiment of the present invention, both the thickness of the base layer and the thickness of the surface layer are preferably within the ranges described above, from the viewpoint of making the gas sealability and level-difference conformability of the multilayer foam sheet excellent.

From the similar viewpoint, the ratio of the thickness of the base layer to the thickness of the surface layer (thickness of base layer/thickness of surface layer) is, for example, 0.2 or more, preferably 2.0 or more, more preferably 3.0 or more, further preferably 4.0 or more, further preferably 5.0 or more, and preferably 30 or less. In the case of a multilayer foam sheet comprising a surface layer on both sides of the base layer, the thickness of the surface layer on determining the above ratio of the thickness is the average value of the thickness of both the surface layers.

Gel Fraction

The gel fraction of the multilayer foam sheet according to the third embodiment of the present invention is preferably from 15 to 80% by mass. When the gel fraction of the multilayer foam sheet is from 15 to 80% by mass, the gas sealability and level-difference conformability of the multilayer foam sheet are more likely to be satisfactory. From such a viewpoint, the gel fraction of the multilayer foam sheet is more preferably 20 to 70% by mass and further preferably 30 to 50% by mass. The gel fraction of the multilayer foam sheet can be measured by the method described in an example.

Average Cell Diameter

In the case where the base layer of the multilayer foam sheet according to the third embodiment of the present invention is a foam layer, the average cell diameter of the base layer is preferably from 20 to 500 µm. When the average cell diameter is within the above range, the moisture permeability is more likely to be adjusted within the desired range described above, and the gas sealability of the multilayer foam sheet is enhanced.

From the above viewpoint, the average cell diameter is more preferably from 30 to 400 µm and further preferably from 40 to 300 µm.

The average cell diameter in the present invention is the larger value of the average value of the cell diameter in the machine direction (MD: machine direction) and the average value of the cell diameter in the direction perpendicular to the MD (TD: transverse direction).

The average cell diameter can be measured by the method described in an example.

Closed Cell Ratio

The closed cell ratio of the multilayer foam sheet according to the third embodiment of the present invention is preferably 90% or more. When the closed cell ratio is 90% or more, the gas sealability and level-difference conformability can be made satisfactory. From the above viewpoint, the closed cell ratio of the foam sheet is further preferably 92% or more. The closed cell ratio is preferably as high as possible and may be 100% or less.

The closed cell ratio can be measured by the method described in an example.

<Expansion Ratio>

In the multilayer foam sheet according to the third embodiment of the present invention, the base layer is a layer comprising a foam layer or a resin film, the surface layer is a layer comprising a foam layer or a resin film, and either of the base layer or the surface layer is a foam layer. The resin film is a non-foam resin layer.

The base layer is preferably a foam layer from the viewpoint of improving the level-difference conformability and is preferably a resin film from the viewpoint of improving the gas sealability. Then, the base layer is preferably a foam layer having a low expansion ratio from the viewpoint of improving both the gas sealability and the level-difference conformability. Although the expansion ratio of the base layer is preferably 1.0 or more, in the case of a foam layer having a low expansion ratio, the expansion ratio may be 1.4 or more, may be 1.8 or more, is preferably 10 or less, more preferably 8 or less, and further preferably 6 or less.

In the case where the base layer is the above low-ratio foam layer or a resin film, at least one of the surface layers is preferably a foam layer having an expansion ratio higher than that of the base layer (high-ratio foam layer), and both the surface layers are more preferably high-ratio foam layers. When the expansion ratio is adjusted in this manner, a multilayer foam sheet excellent in gas sealability and level-difference conformability is more likely to be obtained.

In the case where the surface layer is a high-ratio foam layer, the expansion ratio of the surface layer is preferably from 3 to 40, more preferably from 5 to 30, and further preferably from 7 to 25, from the viewpoint of gas sealability and level-difference conformability.

The base layer also may be a foam layer having a high expansion ratio (high-ratio foam layer). In the case where the base layer is a high-ratio foam layer, the expansion ratio of the base layer is preferably from 3 to 40, more preferably from 5 to 30, and further preferably from 7 to 25.

In the case where the base layer is the above high-ratio foam layer, the surface layer is preferably a resin film or a foam layer having an expansion ratio lower than that of the base layer (low-ratio foam layer), and of these, more preferably a low foam layer, from the viewpoint of level-difference conformability. In the case where the surface layer is a low-ratio foam layer, the expansion ratio of the surface layer is preferably 1.0 or more, from the viewpoint of gas sealability and level-difference conformability, and in the case where the surface layer is a foam layer having a low expansion ratio, the expansion ratio of the surface layer may be 1.4 or more, 1.8 or more, preferably 10 or less, more preferably 8 or less, and further preferably 6 or less.

The expansion ratio of the multilayer foam sheet of the present invention (the expansion ratio of the entire sheet) is preferably from 1.0 to 20, more preferably from 1.4 to 15, and further preferably from 1.8 to 10.

Hereinafter the base layer and surface layer will be described in more detail.

<Base Layer>

A case where the base layer is a foam layer will be described. Examples of types of resins constituting the base layer comprising a foam layer include, but are not particularly limited to, olefinic thermoplastic resins, acrylic resins, polyurethane-based resins, and thermoplastic elastomers. These may be used singly or in combination of two or more. The base layer comprising a foam layer preferably includes at least one resin selected from the group consisting of olefinic thermoplastic resins and thermoplastic elastomers and more preferably includes an olefinic thermoplastic resin. When an olefinic thermoplastic resin or thermoplastic elastomer is used, the flexibility, mechanical strength, and the like of the base layer are more likely to be achieved while the foaming property and the like are made satisfactory. The resins to be used in the base layer comprising a foam layer may be used singly or in combination of two or more. In particular, when an olefinic thermoplastic resin is used, in the case where the base layer is a low-ratio foam layer, the moisture permeability is more likely to be satisfactory.

As the resin and additives constituting the base layer in the multilayer foam sheet according to the third embodiment, ones similar to those of the multilayer foam sheet according to the first embodiment can be used.

The amount of the foaming agent compounded into the expandable resin composition for forming the base layer comprising a foam layer in the multilayer foam sheet according to the third embodiment, in the case where the foam layer is a high-ratio foam layer, is preferably from 1 to 20 parts by mass, more preferably from 3 to 15 parts by mass, and further preferably from 5 to 10 parts by mass based on 100 parts by mass of the resin. When the amount of the foaming agent compounded is set to 1 part by mass or more, the expansion ratio of the foam layer can be enhanced to thereby enable certain flexibility to be imparted to the foam sheet. When the amount of the foaming agent compounded is set to 20 parts by mass or less, the foam layer is prevented from unnecessarily foaming, and the mechanical strength and the like of the foam layer can be made satisfactory. In the case where the foam layer is a low-ratio foam layer, the amount of the foaming agent compounded into the expandable resin composition for forming the low-ratio foam layer is preferably from 0.1 to 10 parts by mass, more preferably from 0.5 to 5 parts by mass, and further preferably from 1 to 3 parts by mass based on 100 parts by mass of the resin. When the amount of the foaming agent is within these ranges, the expansion ratio of the foam layer is more likely to be adjusted within the desired ranges described above.

Next, a case in which the base layer is a resin film will be described.

In the base layer, types of the resin constituting the resin film are not particularly limited. Examples of the resin constituting the resin film include olefinic thermoplastic resins, acrylic resins, polyurethane-based resins, and thermoplastic elastomers. Besides these, silicone-based resins, vinyl chloride-based resins, styrenic resins, polyester-based resins, polyamide-based resins, ionomer-based resins, and the like also may be used.

In the base layer comprising a resin film, the resins may be used singly or in combination of two or more. In the case where the base layer comprises 2 or more layers, the resins each used in the 2 surface layers may be a resin of the same type to each other or may be different resins. From the viewpoint of productivity and from the viewpoint that the layers are easily allowed to have the same or similar physical properties, the resins are preferably of the same type to each other.

The resin constituting the base layer comprising a resin film is preferably a thermoplastic resin, and use of a thermoplastic resin enables the base layer to easily adhere on the surface layer.

The resin to be used as the resin film of the base layer is preferably an olefinic thermoplastic resin among those described above. Use of an olefinic thermoplastic resin allows the reworkability of the foam sheet to be further satisfactory. In the case where an olefinic thermoplastic resin is used in the base layer, the moisture permeability is more likely to be lowered, and the gas sealability also can be satisfactory.

Examples of the olefinic thermoplastic resin include polyethylene resins and polypropylene resins. The olefinic thermoplastic resin also may be an ethylene-vinyl acetate copolymer, an ethylene-ethyl acrylate copolymer, or the like.

Examples of the polyethylene resin include low-density polyethylene (density: less than 0.930 g/cm$^3$), medium-density polyethylene (density: 0.930 g/cm$^3$ or more and less than 0.942 g/cm$^3$), and high-density polyethylene (density: 0.942 g/cm$^3$ or more).

Examples of the low-density polyethylene here preferably include linear low-density polyethylene. The details of the linear low-density polyethylene are as described above, and thus the details thereof are omitted. The details of the polypropylene resin are also as described above, and thus the details thereof are omitted.

Examples of the ethylene-vinyl acetate copolymer to be used in the base layer comprising a resin film include an ethylene-vinyl acetate copolymer containing 50% by mass or more of a constituent unit derived from ethylene.

Examples of the ethylene-ethyl acrylate copolymer include an ethylene-ethyl acrylate copolymer containing 50% by mass or more of a constituent unit derived from ethylene.

Among those described above, from the viewpoint of adhesiveness to the foam layer, bending stress, and tensile strength, an ethylene resin, particularly, linear low-density polyethylene is preferable. From the similar viewpoint, ethylene-vinyl acetate copolymers are also preferable.

In the base layer comprising a resin film, the resin is the main component, and the content of the resin is, for example, 70% by mass or more, preferably 80% by mass or more, and more preferably 90% by mass or more based on the total amount of respective layers. The base layer may contain additives such as an antioxidant, a heat stabilizer, a coloring agent, a fire retardant, an antistatic agent, and a filler, besides the above resin.

The base layer may be crosslinked. The base layer may be crosslinked in conjunction with crosslinking of the base layer, as described in the production method 1 mentioned below, and is preferably crosslinked with ionizing radiation.

<Surface Layer>

The surface layer is laminated on at least one side of the base layer. That is, the surface layer may be laminated on one side of the base layer or may be laminated on both sides of the base layer. Among these, from the viewpoint of improving the reworkability, the surface layer is preferably laminated on both sides of the base layer.

The surface layer is a layer comprising a foam layer or a resin film. The resin film is a resin layer of a non-foam. From the viewpoint of improving the level-difference conformability, the surface layer is preferably a foam layer.

The surface layer can be a layer comprising a resin film as described above. In the surface layer, types of the resin constituting the resin film are not particularly limited. Examples of the resin constituting the resin film include olefinic thermoplastic resins, acrylic resins, polyurethane-based resins, and thermoplastic elastomers, similarly as the resin of the above base layer. In the case where a multilayer foam sheet comprising a surface layer comprising a resin film on both sides of the base material, for example, a thermoplastic elastomer may be employed as the surface layer on both sides of the base material. Besides these, silicone-based resins, vinyl chloride-based resins, styrenic resins, polyester-based resins, polyamide-based resins, ionomer-based resins, and the like also may be used.

In the surface layer, the resins may be used singly or in combination of two or more. When the surface layer is laminated on both sides of the foam layer, the resins each used in the 2 surface layers may be a resin of the same type to each other or may be different resins. From the viewpoint of productivity and from the viewpoint that both the layers are easily allowed to have the same or similar physical properties, the resins are preferably of the same type to each other.

As the resin constituting the surface layer in the multilayer foam sheet according to the third embodiment, one similar to that of the multilayer foam sheet according to the first embodiment can be used.

Adhesive Layer

In the third embodiment of the present invention, the base layer and the surface layer may be laminated directly or may be laminated with another layer interposed therebetween. Examples of another layer include an adhesive layer. As the adhesive layer, a known adhesive, a pressure-sensitive adhesive, or the like may be used. The adhesive layer also may be pressure-sensitive adhesive double coated tape or the like including a pressure-sensitive adhesive layer provided on both sides of the base material.

The adhesive layer may be thick enough not to markedly affect the physical properties such as mechanical strength and flexibility in the multilayer foam sheet. Accordingly, the thickness of the adhesive layer to bond the base layer and the surface layer to each other is preferably smaller than that of the surface layer and more preferably equal to or smaller than one-half of that of the surface layer.

<Method for producing foam sheet>

The multilayer foam sheet according to the third embodiment of the present invention can be produced by a production method similar to that of the multilayer foam sheet according to the first embodiment.

However, in the case where the base layer is a resin film (non-foam), it is only required that a thermally decomposable foaming agent be not compounded into the resin composition for forming the base layer in a production method 1. In a second production method, a resin film may be used in the base layer.

[Pressure-Sensitive Adhesive Tape]

The multilayer foam sheet according to the third embodiment of the present invention may be used in pressure-sensitive adhesive tape including a multilayer foam sheet as the base material. The pressure-sensitive adhesive tape comprises, for example, a multilayer foam sheet and a pressure-sensitive adhesive material provided on at least one side of the multilayer foam sheet. The pressure-sensitive adhesive tape is enabled to adhere to other members through the pressure-sensitive adhesive material. The pressure-sensitive adhesive tape may be one including the pressure-sensitive adhesive material provided on both sides of the multilayer foam sheet or may be one including the pressure-sensitive adhesive material provided on one side of the multilayer foam sheet, but one including the pressure-sensitive adhesive material provided on both sides is preferable.

The pressure-sensitive adhesive material may be one comprising at least a pressure-sensitive adhesive layer, may be a single pressure-sensitive adhesive layer laminated on the surface of the multilayer foam sheet, or may be a pressure-sensitive adhesive double coated sheet attached to the surface of the multilayer foam sheet, but is preferably a single pressure-sensitive adhesive layer. The pressure-sensitive adhesive double coated sheet comprises a base material and a pressure-sensitive adhesive layer provided on both sides of the base material. The pressure-sensitive adhesive double coated sheet is used for allowing one pressure-sensitive adhesive layer to adhere to the multilayer foam sheet as well as for allowing the other pressure-sensitive adhesive layer to adhere to other members.

Examples of the pressure-sensitive adhesive constituting the pressure-sensitive adhesive layer that can be used include, but are not particularly limited to, acrylic pressure-sensitive adhesives, urethane-based pressure-sensitive adhesives, and rubber-based pressure-sensitive adhesives. Additionally, a release sheet such as release paper may be further attached on the pressure-sensitive adhesive material.

The thickness of the pressure-sensitive adhesive material is preferably from 5 to 200 μm, more preferably from 7 to 150 μm, and further preferably from 10 to 100 μm.

[Applications]

The multilayer foam sheet according to the third embodiment of the present invention and pressure-sensitive adhesive tape comprising the multilayer foam sheet are used in, for example, gas sealing applications, electronic device applications, and the like, but are not particularly limited thereto. In particular, the multilayer foam sheet and pressure-sensitive adhesive tape comprising the same are preferably used in hard disks mounted on electronic devices, and specifically used as a sealing material for the outer periphery of the housing of a hard disk under a gas-purged environment.

Examples of electronic devices include mobile phones, cameras, displays, gaming devices, electronic organizers, and personal computers.

The multilayer foam sheet of the present invention and pressure-sensitive adhesive tape comprising the same are excellent both in gas sealability and level-difference conformability as described above. For this reason, the multilayer foam sheet and pressure-sensitive adhesive tape comprising the same are preferably used for temporary fixing of members to be mounted on electronic devices, particularly for temporary fixing to maintain a gas-purged environment. In particular, the multilayer foam sheet and pressure-sensitive adhesive tape comprising the same are more preferably used for temporary fixing of the outer periphery of a housing filled with purge gas therein and more specifically, further preferably used for temporary fixing of the outer periphery of the housing of a hard disk under a gas-purged environment. Here, the term "temporary fixing" herein refers to fixing the outer periphery of a housing during transport or the like to suppress release of purging gas to thereby maintain the gas-purging environment, the fixing being released for use at the time of mounting on an electronic device or the like. Use of the multilayer foam sheet or pressure-sensitive adhesive tape of the present invention on the outer periphery of the housing of a hard disk can maintain the gas-purged environment even when the housing has a level difference.

EXAMPLES

The present invention will be described in detail with reference to Examples, but the present invention is not restricted by these Examples in any way.

First Embodiment

[Measurement Method]

Methods for measuring and evaluating each of the physical properties are as follows.

25% Compressive Strength

The 25% compressive strength was measured at a measurement temperature of 23° C. by a method in accordance with JIS K6767.

<Tensile Strength at Break>

A multilayer foam sheet prepared in each of Examples and Comparative Examples was cut into a dumbbell No. 1 shape specified in JIS K62514.1. This was used as a specimen, and the specimen was stretched in the MD direction and measured at a measurement temperature of 23° C. and a speed of 500 mm/min with a tensile tester (product name: TENSILON RTF235, manufactured by A&D Company, Limited).

<Gel Fraction>

A test piece of about 100 mg was collected from the multilayer foam sheet, and the mass of the test piece A (mg) was precisely weighed. Next, this test piece was immersed in 30 cm$^3$ of xylene at 120° C. and left to stand for 24 hours, and then filtered through 200-mesh wire mesh to collect insoluble on the wire mesh. The insoluble was dried in vacuo, and the mass of the insoluble B (mg) was precisely weighed. The gel fraction (% by mass) was calculated from the obtained value by the following expression.

Gel fraction(% by mass)=100×($B/A$)

<Closed Cell Ratio>

The closed cell ratio was measured in accordance with the method of ASTM D2856 (1998).

Specifically, the closed cell ratio was measured by the following procedure.

First, a planar square-shaped test piece of 5 cm on a side was cut out from the multilayer foam sheet. Then, the thickness of the test piece was measured, the apparent volume of the test piece $V_1$ was calculated, and additionally the weight of the test piece $W_1$ was determined.

Next, the volume occupied by cells $V_2$ was calculated based on the following expression. The density of the matrix resin constituting the test piece was defined as $\rho$ (g/cm$^3$).

Volume occupied by cells $V_2=V_1-W_1/\rho$

Subsequently, the test piece was allowed to sink in distilled water at 23° C. to a depth of 100 mm from the water surface, and a pressure of 15 kPa was applied to the test piece for 3 minutes. Thereafter, the test piece was released from the pressure in the water and left to stand for 1 minute. Then, the test piece was removed from the water, the moisture adhering to the surface of the test piece was removed, the weight of the test piece $W_2$ was determined, and the open cell ratio $F_1$ and the closed cell ratio $F_2$ were calculated based on the following expressions.

Open cell ratio $F_1$(%)=100×($W_2-W_1$)/$V_2$

Closed cell ratio $F_2$(%)=100−$F_1$

<Expansion Ratio>

A multilayer foam sheet, and a base layer and a surface layer composing the multilayer foam sheet each were measured for the specific volumes before and after foaming (unit: cc/g), and the expansion ratio was calculated from specific volume before foaming/specific volume after foaming.

<Average Cell Diameter>

The multilayer foam sheet was cut in the thickness direction along each of the MD and the TD, and a 200-fold magnified micrograph was taken using a digital microscope (manufactured by KEYENCE CORPORATION, product name: "VHX-900"). In the base layer portion in the magnified micrograph taken, the MD cell diameter and the TD cell diameter of all the cells present in a cut face of 2 mm in length each in the MD and the TD were measured, and this operation was repeated 5 times. Then, the average values of the MD cell diameters and the TD cell diameters of all the cells were taken as the MD average cell diameter and the TD average cell diameter, respectively. Of the MD average cell diameter and the TD average cell diameter, the larger value was taken as the average cell diameter.

<Thickness of Base Layer and Surface Layer>

A cross section of the foam sheet was imaged using a digital microscope (manufactured by KEYENCE CORPORATION, product name: "VHX-900"), and the thicknesses of the base layer and the surface layer were measured from the image taken.

<Thickness of Multilayer Foam Sheet>

The sum of the thickness of the base layer and the thickness of the surface layer was taken as the thickness of the multilayer foam sheet.

<Low-Speed Shear Modulus>

The measurement method will be described with reference to FIG. 1. The multilayer foam sheet of the present invention was cut into a size of 5 mm×30 mm to prepare a test piece 11. A wood plate 12 and a wood plate 13 are provided separately. These 2 wood plates each have a size of 30 mm×98 mm and a thickness of 5 mm.

Both sides of the test piece 11 is applied with a pressure-sensitive adhesive ("chemical reaction-type adhesive: Quick bond F9" manufactured by Kansai Polymer Research Institute) to laminate and fix the wood plate 12 and wood plate 13 on both sides of the test piece 11. At this time, as shown in FIG. 1, the wood plate 12 and the wood plate 13 are laminated and fixed on both sides of the test piece 11 such that the one end side 12a of the wood plate 12 and the one end side 13a of the wood plate 13 are disposed thereon as well as that the other end sides 12b and 13b of the wood plates are apart from each other.

Next, application of a pressure for 10 seconds by placing a 5 kg weight on the one end side 12a of the wood plate 12 followed by allowing to stand at 23° C. for 24 hours results in a specimen for measurement of the low-speed shear modulus.

With the other end side 12b of the wood plate 12 of the specimen for measurement prepared described above fixed, the other end side 13b of the wood plate 13 is pulled in the shear direction (the arrow direction in FIG. 1) under conditions of 100 mm/min at 23° C. with a tensile tester. The initial slope of the resulting stress-strain curve is defined as the low-speed shear modulus of the present invention.

<Shear Holding Test>

The multilayer foam sheet was made into a 25 mm×25 mm test piece, both sides thereof were applied with a pressure-sensitive adhesive to prepare pressure-sensitive adhesive tape.

The production method of the pressure-sensitive adhesive tape was according to the following procedure.

0.037 parts by weight of an isocyanate-based crosslinking agent ("CORONATE L45" manufactured by Nippon Polyurethane Industry Co., Ltd., solid content: 45%) and 0.119 parts by weight of an epoxy-based curing agent ("E-5XM" manufactured by Soken Chemical & Engineering Co., Ltd., solid content: 5%) were added to 100 parts by weight of an acrylic pressure-sensitive adhesive ("1882S" manufactured by Soken Chemical & Engineering Co., Ltd., solid content: 16.5%) followed by stirring to obtain a pressure-sensitive adhesive solution.

A release film of 75 μm in thickness was provided, and the release-treated face of this release film was applied with the pressure-sensitive adhesive solution and dried at 110° C. for 5 minutes to form a pressure-sensitive adhesive layer of mm in thickness. This pressure-sensitive adhesive layer was bonded to a surface of the multilayer foam sheet. Then, a pressure-sensitive adhesive layer identical to that described above was bonded also to the other surface of this multilayer foam sheet in the same manner. Thereafter, curing was performed by heating at 40° C. for 48 hours. This gave pressure-sensitive adhesive tape covered with the release film.

The obtained pressure-sensitive adhesive tape was used as a measurement specimen, and an SUS plate 14 (thickness: 1 mm×30 mm×50 mm, unpolished, with a through-hole) and a glass plate 15 (thickness: 3 mm×50 mm×75 mm) were provided.

Figure 2:
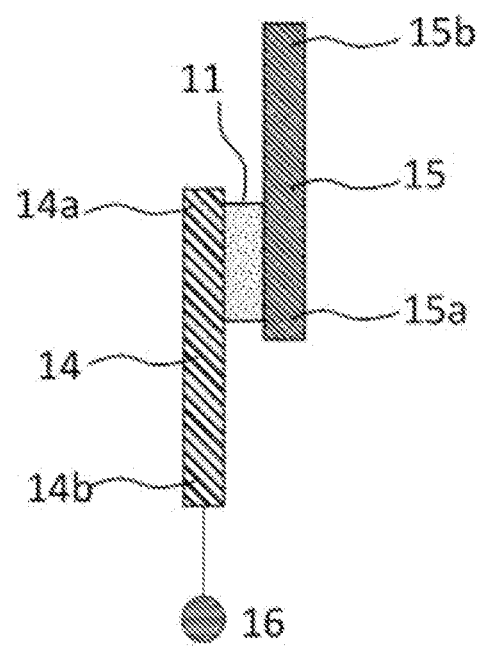
FIG. 2 illustrates a method of a shear holding test.

The SUS plate 14 and the glass plate 15 were washed with ethanol and then dried well. The pressure-sensitive adhesive tape was cut to a size of 25 mm×25 mm, one of the release films was peeled off, and the tape was bonded to the SUS plate 14 so as not to contain cells. The other release film was peeled off, and the tape was bonded to the glass plate 15 so as not to contain cells. At this time, as shown in FIG. 2, the SUS plate 14 and the glass plate 15 were laminated and fixed on both sides of the pressure-sensitive adhesive tape 11 such that the one end side 14a of the SUS plate 14 and the one end side 15a of the glass plate were disposed thereon and that the other end sides 14b and 15b of both the plates were apart from each other. In the case of a multilayer foam sheet having a surface layer only on one side of the base layer, bonding may be made such that the side on the surface layer side is in contact with the glass plate 15 and the side of the base layer having no surface layer is in contact with the SUS plate 14.

Next, the laminate was compression-bonded by placing a weight of 5 kg thereon for 10 seconds to prepare a holding force test sample. The prepared holding force test sample was left to stand at 23° C. and 50% RH for 24 hours and then transferred to a thermostatic chamber at 60° C. and 90% RH. The sample was fixed such that the other end side 15b of the glass plate 15 was located above, weights of 1.6 kg and 0.8 kg 16 were attached to the through-hole of the SUS plate 14, and the time taken for the weights to drop (release time) was measured. A case in which the time elapsed from hanging of the weights to release of the sample and dropping of the weights was 300 hours or more was rated "A", a case in which the time elapsed was 200 hours or more and less than 300 hours was rated "B", and a case in which the time elapsed was less than 200 hours was rated "C".

[Method for Preparing Multilayer Foam Sheet]

Multilayer foam sheets of Examples 1A to 7A and Comparative Examples 1A to 4A were prepared as follows.

Example 1A

A linear low-density polyethylene resin obtained with a metallocene catalyst (metallocene LLDPE, manufactured by Japan Polyethylene Corporation, product name "KERNEL KF283") was provided as a resin for forming the base layer, which was a foam layer, and azodicarbonamide was provided as a thermally decomposable foaming agent. Additionally, zinc oxide (manufactured by Sakai Chemical Industry Co., Ltd., product name "OW-212F") was provided as a decomposition temperature modifier, and a phenolic antioxidant, 2,6-di-t-butyl-p-cresol was provided as an antioxidant.

100 parts by mass of the linear low-density polyethylene resin (metallocene LLDPE), 7.0 parts by mass of the thermally decomposable foaming agent, 1 part by mass of the decomposition temperature modifier, and 0.5 parts by mass of the antioxidant were fed to a first extruder and melt-kneaded at 130° C. to prepare an expandable resin composition 1 for base layer.

A resin, a foaming agent, a decomposition temperature modifier and an antioxidant for surface layer provided were similar to those for the above base layer. 100 parts by mass of the linear low-density polyethylene resin (metallocene LLDPE), 1.5 parts by mass of the thermally decomposable foaming agent, 1 part by mass of the decomposition temperature modifier, and 0.5 parts by mass of the antioxidant were fed to a second and third extruders and melt-kneaded at 130° C. to prepare an expandable resin composition 2 for surface layer.

The expandable resin composition 1 at a thickness of 550 μm from the first extruder and the expandable resin composition 2 at a thickness of 320 μm from each of the second and third extruders were coextruded to give an unfoamed multilayer laminate sheet comprising a layer comprising the expandable resin composition 1 for base layer and layers laminated on both sides of the layer, the layers comprising the expandable resin composition 2 for surface layer.

Next, the multilayer laminate sheet was irradiated with an electron beam of 4.0 Mrad at an accelerating voltage of 500 kV to crosslink the multilayer laminate sheet. Thereafter, the crosslinked multilayer laminate sheet was continuously fed into a foaming furnace retained at 250° C. by hot air and an infrared heater, heated, and foamed. The foamed sheet was stretched according to the target thickness by a stretch process to thereby give a multilayer foam sheet of Example 1, in which the foam layers having a different ratio were laminated.

Example 2A

A multilayer foam sheet was obtained in the same manner as in Example 1A except that the amount of the foaming agent of the expandable resin composition 2 was changed from 1.5 parts by mass to 2.2 parts by mass, the extrusion thickness of the expandable resin composition 2 was changed from 320 μm to 400 μm, and the extrusion thickness of the expandable resin composition 1 was changed from 550 μm to 320 μm.

Example 3A

A multilayer foam sheet was obtained in the same manner as in Example 1A except that the amount of the foaming agent of the expandable resin composition 2 was changed from 1.5 parts by mass to 2.8 parts by mass, the extrusion thickness of the expandable resin composition 2 was changed from 320 μm to 200 μm, the amount of the foaming agent of the expandable composition 1 was changed from 7.0 parts by mass to 5.0 parts by mass, and the extrusion thickness of the expandable resin composition 1 was changed from 550 μm to 350 μm.

Example 4A

A multilayer foam sheet was obtained in the same manner as in Example 3A except that the amount of the foaming agent of the expandable resin composition 2 of Example 3A was changed from 2.8 parts by mass to 2.0 parts by mass, the extrusion thickness of the expandable resin composition 2 was changed from 200 μm to 80 μm, the extrusion thickness of the expandable composition 1 was changed from 350 μm to 240 μm, and the irradiation dose of the electron beam was changed from 4.0 Mrad to 5.0 Mrad.

Example 5A

A multilayer foam sheet was obtained in the same manner as in Example 1A except that the extrusion thickness of the expandable resin composition 2 of Example 1A was changed from 320 μm to 500 μm, the amount of the foaming agent of the expandable resin composition 1 was changed from 7.0 parts by mass to 6.5 parts by mass, and the extrusion thickness of the expandable composition 1 was changed from 550 μm to 450 μm.

Example 6A

A multilayer foam sheet was obtained in the same manner as in Example except that the resin contained in the expandable resin composition 1 and expandable resin composition 2 was replaced by a polypropylene resin (manufactured by Prime Polymer Co., Ltd., product name "E-333GV").

Example 7A

A multilayer foam sheet was obtained in the same manner as in Example except that the resin contained in the expandable resin composition 1 was replaced by a styrenic thermoplastic elastomer (HYBRAR 7311F manufactured by Kuraray Co., Ltd.).

Comparative Example 1A

A multilayer foam sheet was obtained in the same manner as in Example 1A except that the amount of the foaming agent of the expandable resin composition 2 was changed from 1.5 parts by mass to 4.0 parts by mass, the extrusion thickness of the expandable resin composition 2 was changed from 320 μm to 100 μm, and the extrusion thickness of the expandable resin composition 1 was changed from 550 μm to 500 μm.

Comparative Example 2A

A multilayer foam sheet was obtained in the same manner as in Example 2A except that the amount of the foaming agent of the expandable resin composition 2 was changed from 2.2 parts by mass to 0.8 parts by mass, the extrusion thickness of the expandable resin composition 2 was changed from 400 μm to 700 μm, and the extrusion thickness of the expandable resin composition 1 was changed from 320 μm to 250 μm.

Comparative Example 3A

A multilayer foam sheet was obtained in the same manner as in Example 1A except that the amount of the foaming agent of the expandable resin composition 2 was changed from 1.5 parts by mass to 8 parts by mass, the extrusion thickness of the expandable resin composition 2 was changed from 320 μm to 90 μm, the amount of the foaming agent of the expandable composition 1 was changed from 7.0 parts by mass to 3.0 parts by mass, and the extrusion thickness of the expandable composition 1 was changed from 550 μm to 790 μm.

Comparative Example 4A

A multilayer foam sheet was obtained in the same manner as in Comparative Example 2A except that the extrusion thickness of the expandable resin composition 2 was changed from 700 μm to 900 μm, and the extrusion thickness of the expandable resin composition 1 was changed from 250 μm to 190 μm.

TABLE 1

| | | | | | | Example | | | | | | | Comparative Example | | | |
|---|---|---|---|---|---|---|---|---|---|---|---|---|---|---|---|---|
| | | | | | | 1A | 2A | 3A | 4A | 5A | 6A | 7A | 1A | 2A | 3A | 4A |
| Base layer (foam layer) | Expandable resin composition 1 | Resin | Metallocene LLDPE (KERNEL KF283) | Parts by mass | | 100 | 100 | 100 | 100 | 100 | | | 100 | 100 | 100 | 100 |
| | | | Polypropylene resin (E-333GV) | | | | | | | | 100 | | | | | |
| | | | Thermoplastic elastomer (HYBRAR 7311F) | | | | | | | | | 100 | | | | |
| | | Thermally decomposable foaming agent | Azodicarbonamide | | | 7.0 | 7.0 | 5.0 | 5.0 | 6.5 | 6.5 | 6.5 | 7.0 | 7.0 | 3.0 | 7.0 |
| | | Decomposition temperature modifier | Zinc oxide | | | 1.0 | 1.0 | 1.0 | 1.0 | 1.0 | 1.0 | 1.0 | 1.0 | 1.0 | 1.0 | 1.0 |
| | | Antioxidant | 2,6-Di-t-butyl-p-cresol | | | 0.5 | 0.5 | 0.5 | 0.5 | 0.5 | 0.5 | 0.5 | 0.5 | 0.5 | 0.5 | 0.5 |
| Surface layer (foam layer) | Expandable resin composition 2 | Resin | Metallocene LLDPE (KERNEL KF283) | Parts by mass | | 100 | 100 | 100 | 100 | 100 | | 100 | 100 | 100 | 100 | 100 |
| | | | Polypropylene resin (E-333GV) | | | | | | | | 100 | | | | | |
| | | Thermally decomposable foaming agent | Azodicarbonamide | | | 1.5 | 2.2 | 2.8 | 2.0 | 1.5 | 1.5 | 1.5 | 4.0 | 0.8 | 8.0 | 0.8 |
| | | Decomposition temperature modifier | Zinc oxide | | | 1.0 | 1.0 | 1.0 | 1.0 | 1.0 | 1.0 | 1.0 | 1.0 | 1.0 | 1.0 | 1.0 |
| | | Antioxidant | 2,6-Di-t-butyl-p-cresol | | | 0.5 | 0.5 | 0.5 | 0.5 | 0.5 | 0.5 | 0.5 | 0.5 | 0.5 | 0.5 | 0.5 |
| Production conditions | | Electron beam irradiation dose | | Mrad | | 4.0 | 4.0 | 4.0 | 5.0 | 4.0 | 4.0 | 4.0 | 4.0 | 4.0 | 4.0 | 4.0 |

The configuration, performance, and evaluation results of the multilayer foam sheets of Examples 1A to 7A and Comparative Examples 1A to 4A are shown in Table 2. The thickness and expansion ratio of the surface layer in the table represent the thickness and expansion ratio of one surface layer of the surface layers provided on both sides of the base material, and the surface layers on both sides have the same thickness and expansion ratio.

a speed of 500 mm/min with a tensile tester (product name: TENSILON RTF235, manufactured by A&D Company, Limited).

<Expansion Ratio and Density>

A multilayer foam sheet, and a base layer and a surface layer composing the multilayer foam sheet each were measured for the specific volumes before and after foaming (unit: cc/g), and the expansion ratio was calculated from

TABLE 2

| | | | Example | | | | | | | Comparative Example | | | |
|---|---|---|---|---|---|---|---|---|---|---|---|---|---|
| | | | 1A | 2A | 3A | 4A | 5A | 6A | 7A | 1A | 2A | 3A | 4A |
| Configuration | Base layer (foam layer) | Thickness (μm) | 710 | 600 | 200 | 200 | 900 | 900 | 900 | 700 | 600 | 500 | 400 |
| | | Expansion ratio | 15 | 14 | 10 | 8 | 12 | 12 | 12 | 20 | 14 | 3 | 14 |
| | Surface layer (foam layer) | Thickness (μm) | 45 | 150 | 50 | 20 | 150 | 150 | 150 | 50 | 150 | 200 | 200 |
| | | Expansion ratio | 1.6 | 3.0 | 5 | 2.5 | 1.8 | 1.8 | 1.8 | 7 | 1.2 | 10 | 1.5 |
| | Multilayer foam sheet (entire) | Thickness (μm) | 800 | 900 | 300 | 240 | 1200 | 1200 | 1200 | 800 | 900 | 900 | 800 |
| | | Expansion ratio | 7.72 | 6.30 | 7.50 | 5.85 | 4.97 | 4.97 | 4.97 | 16.23 | 3.07 | 4.35 | 2.71 |
| | | Density (g/cm$^3$) | 0.13 | 0.16 | 0.13 | 0.17 | 0.20 | 0.20 | 0.20 | 0.06 | 0.33 | 0.23 | 0.37 |
| | Thickness of base layer/thickness of surface layer | | 16 | 4 | 4 | 10 | 6 | 6 | 6 | 14 | 4 | 2.5 | 2 |
| Performance | Low-speed shear modulus (MPa) | | 112 | 95 | 65 | 101 | 110 | 134 | 105 | 45 | 117 | 8 | 113 |
| | Gel fraction (% by mass) | | 34 | 55 | 46 | 62 | 38 | 42 | 58 | 31 | 28 | 22 | 22 |
| | Closed cell ratio (%) | | 97 | 98 | 95 | 97 | 98 | 97 | 98 | 98 | 97 | 97 | 97 |
| | 25% Compressive strength (kPa) | | 50 | 65 | 59 | 52 | 92 | 118 | 84 | 48 | 180 | 87 | 160 |
| | Tensile strength at break (N/10 mm) | | 26 | 36 | 10 | 10 | 60 | 72 | 55 | 12 | 73 | 9 | 74 |
| | Average cell diameter of base layer (μm) | | 134 | 120 | 78 | 65 | 283 | 371 | 235 | 166 | 182 | 219 | 195 |
| Evaluation | Shear holding test | 0.8 kg | A | A | A | A | A | A | A | C | A | C | A |
| | | 1.6 kg | A | A | B | A | A | A | A | C | A | C | A |

The multilayer foam sheets of Examples 1A to 7A in Table 2 have a 25% compressive strength of 125 kPa or less, and the results of the shear holding test thereof were satisfactory. From the results, the multilayer foam sheet of each Example was found to be excellent in flexibility and mechanical strength in the shear direction.

In contrast, the multilayer foam sheets of Comparative Examples 1A and 3A had poor results of the shear holding test and were found to be inferior in mechanical strength in the shear direction. The multilayer foam sheets of Comparative Examples 2A and 4A had a 25% compressive strength exceeding 125 kPa and were found to be inferior in flexibility.

Second Embodiment

[Measurement Method]

Methods for measuring and evaluating each of the physical properties are as follows.

<25% Compressive Strength>

The 25% compressive strength was measured at a measurement temperature of 23° C. by a method in accordance with JIS K6767.

<Tensile Strength at Break>

A multilayer foam sheet prepared in each of Examples and Comparative Examples was cut into a dumbbell No. 1 shape specified in JIS K62514.1. This was used as a specimen, and the specimen was stretched in the MD direction and measured at a measurement temperature of 23° C. and specific volume before foaming/specific volume after foaming. Additionally, the density was calculated from the measured specific volumes.

<Thickness of Base Layer and Surface Layer>

A cross section of the foam sheet was imaged using a digital microscope (manufactured by KEYENCE CORPORATION, product name: "VHX-900"), and the thicknesses of the base layer and the surface layer were measured from the image taken.

<Thickness of Multilayer Foam Sheet>

The sum of the thickness of the base layer and the thickness of the surface layer was taken as the thickness of the multilayer foam sheet.

<Average Cell Diameter>

The multilayer foam sheet was cut in the thickness direction along each of the MD and the TD, and a 200-fold magnified micrograph was taken using a digital microscope (manufactured by KEYENCE CORPORATION, product name: "VHX-900"). In the base layer portion in the magnified micrograph taken, the MD cell diameter and the TD cell diameter of all the cells present in a cut face of 2 mm in length each in the MD and the TD were measured, and this operation was repeated 5 times. Then, the average values of the MD cell diameters and the TD cell diameters of all the cells were taken as the MD average cell diameter and the TD average cell diameter, respectively. Of the MD average cell diameter and the TD average cell diameter, the larger value was taken as the average cell diameter.

<Closed Cell Ratio>

The closed cell ratio was measured in accordance with the method of ASTM D2856 (1998).

Specifically, the closed cell ratio was measured by the following procedure.

First, a planar square-shaped test piece of 5 cm on a side was cut out from the multilayer foam sheet. Then, the thickness of the test piece was measured, the apparent volume of the test piece $V_1$ was calculated, and additionally the weight of the test piece $W_1$ was determined.

Next, the volume occupied by cells V2 was calculated based on the following expression. The density of the matrix resin constituting the test piece was defined as ρ (g/cm 3).

Volume occupied by cells $V_2=V_1-W_1/\rho$

Subsequently, the test piece was allowed to sink in distilled water at 23° C. to a depth of 100 mm from the water surface, and a pressure of 15 kPa was applied to the test piece for 3 minutes. Thereafter, the test piece was released from the pressure in the water and left to stand for 1 minute. Then, the test piece was removed from the water, the moisture adhering to the surface of the test piece was removed, the weight of the test piece $W_2$ was determined, and the open cell ratio $F_1$ and the closed cell ratio $F_2$ were calculated based on the following expressions.

Open cell ratio $F_1(\%)=100\times(W_2-W_1)/V_2$

Closed cell ratio $F_2(\%)=100-F_1$

<Gel Fraction>

A test piece of about 100 mg was collected from the multilayer foam sheet, and the mass of the test piece A (mg) was precisely weighed. Next, this test piece was immersed in 30 cm 3 of xylene at 120° C. and left to stand for 24 hours, and then filtered through 200-mesh wire mesh to collect insoluble on the wire mesh. The insoluble was dried in vacuo, and the mass of the insoluble B (mg) was precisely weighed. The gel fraction (% by mass) was calculated from the obtained value by the following expression. The test piece was uniformly collected in the thickness direction of the multilayer foam sheet.

Gel fraction(% by mass)=$100\times(B/A)$

<Reworkability>

Both sides of a foam sheet were allowed to have a pressure-sensitive adhesive layer, acrylic plates were bonded to both sides, and the resultant was allowed to stand at 23° C. for 24 hours. Thereafter, a cutter was inserted between the bonded acrylic plates to tear the housing. When the base material left on the housing was peeled off, one broken at the pressure-sensitive adhesive layer interface, as one having reworkability, was rated "A", and one not broken at the pressure-sensitive adhesive layer interface, as one having no reworkability, was rated "B".

<Level-Difference Conformability>

One side of a foam sheet was allowed to have a pressure-sensitive adhesive layer, the foam sheet was bonded to an acrylic plate having a 2 mm level difference on one side, the level difference being formed by a projection of a 2 mm×2 mm×2 mm cube provided in the center, and the resultant was allowed to stand at 23° C. for 24 hours. Thereafter, a 50-fold magnified micrograph was taken using a digital microscope (manufactured by KEYENCE CORPORATION, product name: "VHX-900"), and the area of a gap generated between the level difference and the pressure-sensitive adhesive layer (gap area) was calculated.

<Comprehensive Evaluation>

A foam sheet having reworkability evaluated as "A" and having a gap area of 3.0 cm$^2$ or less was evaluated as "G (Good)". A foam sheet having reworkability evaluated as "B" or having a gap area of more than 3.0 cm$^2$ was evaluated as "B (Bad)".

[Method for Preparing Multilayer Foam Sheet]0

Multilayer foam sheets of Examples 1B to 2B and Comparative Examples 1B to 4B were prepared as follows.

Example 1B

A linear low-density polyethylene resin obtained with a metallocene catalyst (metallocene LLDPE, manufactured by Japan Polyethylene Corporation, product name "KERNEL KF283") was provided as a resin for forming the base layer, which was a foam layer, and azodicarbonamide was provided as a thermally decomposable foaming agent. Additionally, zinc oxide (manufactured by Sakai Chemical Industry Co., Ltd., product name "OW-212F") was provided as a decomposition temperature modifier, and a phenolic antioxidant, 2,6-di-t-butyl-p-cresol was provided as an antioxidant.

100 parts by mass of the linear low-density polyethylene resin (metallocene LLDPE), 7.0 parts by mass of the thermally decomposable foaming agent, 1 part by mass of the decomposition temperature modifier, and 0.5 parts by mass of the antioxidant were fed to a first extruder and melt-kneaded at 130° C. to prepare an expandable resin composition 1 for base layer.

A resin, a foaming agent, a decomposition temperature modifier and an antioxidant for surface layer provided were similar to those for the above base layer. 100 parts by mass of the linear low-density polyethylene resin (metallocene LLDPE), 1.5 parts by mass of the thermally decomposable foaming agent, 1 part by mass of the decomposition temperature modifier, and 0.5 parts by mass of the antioxidant were fed to a second and third extruders and melt-kneaded at 130° C. to prepare an expandable resin composition 2 for surface layer.

The expandable resin composition 1 at a thickness of 550 μm from the first extruder and the expandable resin composition 2 at a thickness of 320 μm from each of the second and third extruders were coextruded to give an unfoamed multilayer laminate sheet comprising a layer comprising the expandable resin composition 1 for base layer and layers laminated on both sides of the layer, the layers comprising the expandable resin composition 2 for surface layer.

Next, the multilayer laminate sheet was irradiated with an electron beam of 4.0 Mrad at an accelerating voltage of 500 kV to crosslink the multilayer laminate sheet. Thereafter, the crosslinked multilayer laminate sheet was continuously fed into a foaming furnace retained at 250° C. by hot air and an infrared heater, heated, and foamed. The foamed sheet was stretched according to the target thickness by a stretch process to thereby give a multilayer foam sheet of Example 1B, in which the foam layers having a different ratio were laminated.

Example 2B

The resin contained in the expandable resin composition 1 was replaced by a styrenic thermoplastic elastomer (HYBRAR 7311F manufactured by Kuraray Co., Ltd.). The amount of the foaming agent of the expandable resin composition 1 was changed from 7.0 parts by mass to 6.5 parts by mass, and the extrusion thickness of the expandable resin composition 1 was changed from 550 μm to 320 μm. The extrusion thickness of the expandable resin composition 2 was changed from 320 μm to 400 μm. A multilayer foam sheet was obtained in the same manner as in Example 1B except for those described above.

Comparative Example 1B

A single layer foam sheet was obtained in the same manner as in Example 1B except that no material was fed to the second and third extruders and the second and third extruders were not used.

Comparative Example 2B

A single layer foam sheet was obtained in the same manner as in Comparative Example 1B except that the amount of the foaming agent of the expandable resin composition 1 was changed from 7.0 parts by mass to 4.5 parts by mass.

Comparative Example 3B

A single layer foam sheet was obtained in the same manner as in Comparative Example 1B except that the amount of the foaming agent of the expandable resin composition 1 was changed from 7.0 parts by mass to 1.7 parts by mass and the extrusion thickness of the expandable resin composition 1 was changed from 550 μm to 380 μm.

Comparative Example 4B

The single layer foam sheet obtained in Comparative Example 1B was interposed between PET films of 100 μm in thickness. Then, the single layer foam sheet interposed between the PET films was continuously fed into a heating furnace retained at about 100° C. by hot air and an infrared heater, heated, and laminated. This gave a multilayer foam sheet of Comparative Example 4B, the sheet including the films laminated as the upper and lower layers.

TABLE 3

| | | | | | Example | | Comparative Example | | | |
|---|---|---|---|---|---|---|---|---|---|---|
| | | | | | 1B | 2B | 1B | 2B | 3B | 4B |
| Base layer (foam layer) | Expandable resin composition 1 | Resin | Metallocene LLDPE (KERNEL KF283) | Parts by mass | 100 | — | 100 | 100 | 100 | 100 |
| | | | Thermoplastic elastomer (HYBRAR 7311F) | | — | 100 | — | — | — | — |
| | | Thermally decomposable foaming agent | Azodicarbonamide | | 7.0 | 6.5 | 7.0 | 4.5 | 1.7 | 7.0 |
| | | Decomposition temperature modifier | Zinc oxide | | 1.0 | 1.0 | 1.0 | 1.0 | 1.0 | 1.0 |
| | | Antioxidant | 2,6-Di-t-butyl-p-cresol | | 0.5 | 0.5 | 0.5 | 0.5 | 0.5 | 0.5 |
| Surface layer (foam layer) | Expandable resin composition 2 | Resin | Metallocene LLDPE (KERNEL KF283) | Parts by mass | 100 | 100 | — | — | — | — |
| | | Thermally decomposable foaming agent | Azodicarbonamide | | 1.5 | 1.5 | — | — | — | — |
| | | Decomposition temperature modifier | Zinc oxide | | 1.0 | 1.0 | — | — | — | — |
| | | Antioxidant | 2,6-Di-t-butyl-p-cresol | | 0.5 | 0.5 | — | — | — | — |
| Surface layer (resin film) | PET (polyethylene terephthalate) | | | Parts by mass | — | — | — | — | — | 100 |
| Production conditions | Electron beam irradiation dose | | | Mrad | 4.0 | 4.0 | 4.0 | 4.0 | 4.0 | 4.0 |

The configuration, performance, and evaluation results of the foam sheets of Examples 1B to 2B and Comparative Examples 1B to 4B are shown in Table 2. The thickness and expansion ratio of the surface layer in the table represent the thickness and expansion ratio of one surface layer of the surface layers provided on both sides of the base material, and the surface layers on both sides have the same thickness and expansion ratio.

sured for the specific volumes before and after foaming (unit: cc/g), and the expansion ratio was calculated from specific volume before foaming/specific volume after foaming. Additionally, the density was calculated from the measured specific volumes.

<Density>

The density means an apparent density, which is a value measured in accordance with JIS K7222 (2005).

TABLE 4

| | | | Example | | Comparative Example | | | |
|---|---|---|---|---|---|---|---|---|
| | | | 1B | 2B | 1B | 2B | 3B | 4B |
| Config-uration | Base layer | Structure | 3 Layers | 3 Layers | 1 Layer | 1 Layer | 1 Layer | 3 Layers |
| | | Thickness (μm) | 710 | 900 | 700 | 500 | 200 | 700 |
| | | Expansion ratio | 15 | 12 | 15.0 | 8.0 | 1.8 | 15 |
| | Surface layer | Thickness (μm) | 45 | 150 | — | — | — | 100 |
| | | Expansion ratio | 1.6 | 1.8 | — | — | — | — |
| | Entire foam sheet | Thickness (μm) | 800 | 1200 | 700 | 500 | 200 | 900 |
| | | Expansion ratio | 7.7 | 5.0 | 15.0 | 8.0 | 1.8 | 5.6 |
| | | Density (g/cm$^3$) | 0.13 | 0.20 | 0.07 | 0.13 | 0.56 | 0.18 |
| | Thickness of base layer/thickness of surface layer | | 16 | 6 | — | — | — | 7 |
| Performance | 25% Compressive strength (kPa) | | 50 | 84 | 45 | 40 | 900 | 50 |
| | Tensile strength at break (N/10 mm) | | 26 | 55 | 20 | 82 | 720 | 712 |
| | Average cell diameter of base layer (μm) | | 134 | 235 | 130 | 105 | 86 | 132 |
| | Closed cell ratio (%) | | 97 | 98 | 96 | 97 | 95 | 97 |
| | Gel fraction (% by mass) | | 34 | 58 | 34 | 38 | 42 | 34 |
| Evaluation | Reworkability | | A | A | B | B | B | A |
| | Level-difference conformability (gap area) (mm$^2$) | | 1.6 | 1.7 | 1.6 | 3.4 | 3.5 | 6.6 |
| | Comprehensive evaluation | | G | G | B | B | B | B |

The multilayer foam sheets of Examples 1B to 2B in Table 2 had a 25% compressive strength of 125 kPa or less and a tensile strength at break of 10 to 700 N/10 mm, and thus both the reworkability and level-difference conformability were satisfactory.

In contrast, the foam sheets of Comparative Examples 1B to 3B, which were single layer foam sheets, failed to make both the reworkability and level-difference conformability satisfactory. The foam sheet of Comparative Example 4B, which was a multilayer foam sheet, had a tensile strength at break of more than 700 N/10 mm, and thus the level-difference conformability was poor.

Third Embodiment

[Measurement Method]

Methods for measuring and evaluating each of the physical properties are as follows.

<Thickness of Base Layer and Surface Layer>

A cross section of the foam sheet was imaged using a digital microscope (manufactured by KEYENCE CORPORATION, product name: "VHX-900"), and the thicknesses of the base layer and the surface layer were measured from the image taken.

<Expansion Ratio>

A multilayer foam sheet, and a base layer and a surface layer composing the multilayer foam sheet each were mea- <Thickness of Multilayer Foam Sheet>

The sum of the thickness of the base layer and the thickness of the surface layer was taken as the thickness of the multilayer foam sheet.

<Gel Fraction>

A test piece of about 100 mg was collected from the multilayer foam sheet, and the mass of the test piece A (mg) was precisely weighed. Next, this test piece was immersed in 30 cm$^3$ of xylene at 120° C. and left to stand for 24 hours, and then filtered through 200-mesh wire mesh to collect insoluble on the wire mesh. The insoluble was dried in vacuo, and the mass of the insoluble B (mg) was precisely weighed. The gel fraction (% by mass) was calculated from the obtained value by the following expression. The test piece was uniformly collected in the thickness direction of the multilayer foam sheet.

Gel fraction(% by mass)=100×(B/A)

<Closed Cell Ratio>

The closed cell ratio was measured in accordance with the method of ASTM D2856 (1998).

Specifically, the closed cell ratio was measured by the following procedure.

First, a planar square-shaped test piece of 5 cm on a side was cut out from the multilayer foam sheet. Then, the thickness of the test piece was measured, the apparent volume of the test piece $V_1$ was calculated, and additionally the weight of the test piece $W_1$ was determined.

Next, the volume occupied by cells $V_2$ was calculated based on the following expression. The density of the matrix resin constituting the test piece was defined as $\rho$ (g/cm$^3$).

Volume occupied by cells $V_2=V_1-W_1/\rho$

Subsequently, the test piece was allowed to sink in distilled water at 23° C. to a depth of 100 mm from the water surface, and a pressure of 15 kPa was applied to the test piece for 3 minutes. Thereafter, the test piece was released from the pressure in the water and left to stand for 1 minute. Then, the test piece was removed from the water, the moisture adhering to the surface of the test piece was removed, the weight of the test piece $W_2$ was determined, and the open cell ratio $F_1$ and the closed cell ratio $F_2$ were calculated based on the following expressions.

Open cell ratio $F_1(\%)=100\times(W_2-W_1)/V_2$

Closed cell ratio $F_2(\%)=100-F_1$

<Average Cell Diameter>

The multilayer foam sheet was cut in the thickness direction along each of the MD and the TD, and a 200-fold magnified micrograph was taken using a digital microscope (manufactured by KEYENCE CORPORATION, product name: "VHX-900"). In the base layer portion in the magnified micrograph taken, the MD cell diameter and the TD cell diameter of all the cells present in a cut face of 2 mm in length each in the MD and the TD were measured, and this operation was repeated 5 times. Then, the average values of the MD cell diameters and the TD cell diameters of all the cells were taken as the MD average cell diameter and the TD average cell diameter, respectively. Of the MD average cell diameter and the TD average cell diameter, the larger value was taken as the average cell diameter.

<25% Compressive Strength>

The 25% compressive strength was measured at a measurement temperature of 23° C. by a method in accordance with JIS K6767 (1999).

<Moisture Permeability>

The multilayer foam sheet prepared in each of Examples and Comparative Examples were measured in accordance with JIS Z0208 (1976).

<Comprehensive Evaluation>

A multilayer foam sheet having a 25% compressive strength of 125 kPa or less and a moisture permeability of 15 g/m·24 hr or less was evaluated as "G (Good)". A multilayer foam sheet in which either the 25% compressive strength or the moisture permeability did not satisfy the specification described above was evaluated as "B (Bad)".

[Method for Preparing Multilayer Foam Sheet]

Multilayer foam sheets of Examples 1C to 3C and Comparative Examples 1C to 3C were prepared as follows.

Example 1C

A linear low-density polyethylene resin obtained with a metallocene catalyst (metallocene LLDPE, manufactured by Japan Polyethylene Corporation, product name "KERNEL KF283") was provided as a resin for forming the base layer, which was a foam layer, and azodicarbonamide was provided as a thermally decomposable foaming agent. Additionally, zinc oxide (manufactured by Sakai Chemical Industry Co., Ltd., product name "OW-212F") was provided as a decomposition temperature modifier, and a phenolic antioxidant, 2,6-di-t-butyl-p-cresol was provided as an antioxidant.

100 parts by mass of the linear low-density polyethylene resin (metallocene LLDPE), 7.0 parts by mass of the thermally decomposable foaming agent, 1 part by mass of the decomposition temperature modifier, and 0.5 parts by mass of the antioxidant were fed to a first extruder and melt-kneaded at 130° C. to prepare a resin composition (expandable resin composition) 1 for base layer.

A resin, a foaming agent, a decomposition temperature modifier and an antioxidant for surface layer provided were similar to those for the above base layer. 100 parts by mass of the linear low-density polyethylene resin (metallocene LLDPE), 1.5 parts by mass of the thermally decomposable foaming agent, 1 part by mass of the decomposition temperature modifier, and 0.5 parts by mass of the antioxidant were fed to a second and third extruders and melt-kneaded at 130° C. to prepare a resin composition (expandable resin composition) 2 for surface layer.

The resin composition 1 at a thickness of 550 µm from the first extruder and the resin composition 2 at a thickness of 320 µm from each of the second and third extruders were coextruded to give an unfoamed multilayer laminate sheet comprising a layer comprising the resin composition 1 for base layer and layers laminated on both sides of the layer, the layers comprising the resin composition 2 for surface layer.

Next, the multilayer laminate sheet was irradiated with an electron beam of 4.0 Mrad at an accelerating voltage of 500 kV to crosslink the multilayer laminate sheet. Thereafter, the crosslinked multilayer laminate sheet was continuously fed into a foaming furnace retained at 250° C. by hot air and an infrared heater, heated, and foamed. The foamed sheet was stretched according to the target thickness by a stretch process to thereby give a multilayer foam sheet of Example 1C, in which the foam layers having a different ratio were laminated.

Example 2C

A linear low-density polyethylene resin obtained with a metallocene catalyst (metallocene LLDPE, manufactured by Japan Polyethylene Corporation, product name "KERNEL KF283") and a high-density polyethylene resin (HDPE, manufactured by Japan Polyethylene Corporation, product name "NOVATEC HDHY420") were provided as resins for forming the base layer, which was a resin film. Additionally, zinc oxide (manufactured by Sakai Chemical Industry Co., Ltd., product name "OW-212F") was provided as a decomposition temperature modifier, and a phenolic antioxidant, 2,6-di-t-butyl-p-cresol was provided as an antioxidant.

35 parts by mass of a linear low-density polyethylene resin (metallocene LLDPE), 65 parts by mass of a high-density polyethylene resin (HDPE), 1 part by mass of a decomposition temperature modifier, and 0.5 parts by mass of an antioxidant were fed to a first extruder and melt-kneaded at 130° C. to prepare a resin composition 1 for base layer.

Components for surface layer provided were similar to those for Example 1C. 100 parts by mass of the linear low-density polyethylene resin (metallocene LLDPE), 6.0 parts by mass of the thermally decomposable foaming agent, 1 part by mass of the decomposition temperature modifier, and 0.5 parts by mass of the antioxidant were fed to a second and third extruders and melt-kneaded at 130° C. to prepare a resin composition (expandable resin composition) 2 for surface layer.

The resin composition 1 at a thickness of 620 µm from the first extruder and the resin composition 2 at a thickness of 240 μm from each of the second and third extruders were coextruded to give an unfoamed multilayer laminate sheet comprising a layer comprising the resin composition 1 for base layer and layers laminated on both sides of the layer, the layers comprising the resin composition 2 for surface layer.

Next, the multilayer laminate sheet was irradiated with an electron beam of 4.0 Mrad at an accelerating voltage of 500 kV to crosslink the multilayer laminate sheet. Thereafter, the crosslinked multilayer laminate sheet was continuously fed into a foaming furnace retained at 250° C. by hot air and an infrared heater, heated, and foamed. The foamed sheet was stretched according to the target thickness by a stretch process to thereby give a multilayer foam sheet of Example 2C, in which the foam layers having a different ratio were laminated.

Example 3C

The amount of the thermally decomposable foaming agent of the resin composition 1 was changed from 7.0 parts by mass to 0 part by mass, and the extrusion thickness of the resin composition 1 was changed from 550 μm to 120 μm. The amount of the thermally decomposable foaming agent of the resin composition 2 was changed from 1.5 parts by mass to 6.5 parts by mass, and the extrusion thickness of the resin composition 2 was changed from 320 μm to 130 μm. A multilayer foam sheet was obtained in the same manner as in Example 1C except for those described above.

Comparative Example 1C

A single layer foam sheet was obtained in the same manner as in Example 1C except that no material was fed to the second and third extruders and the second and third extruders were not used.

Comparative Example 2C

A single layer foam sheet was obtained in the same manner as in Comparative Example 1C except that the amount of the thermally decomposable foaming agent of the resin composition 1 was changed from 7.0 parts by mass to 4.5 parts by mass.

Comparative Example 3C

A single layer foam sheet was obtained in the same manner as in Comparative Example 1C except that the amount of the thermally decomposable foaming agent of the resin composition 1 was changed from 7.0 parts by mass to 1.7 parts by mass and the extrusion thickness of the resin composition 1 was changed from 550 μm to 380 μm.

TABLE 5

| | | | | | Example | | | Comparative Example | | |
|---|---|---|---|---|---|---|---|---|---|---|
| | | | | | 1C | 2C | 3C | 1C | 2C | 3C |
| Base layer | Resin composition 1 | Resin | Metallocene LLDPE (KERNEL KF283) | Parts by mass | 100 | 35 | 100 | 100 | 100 | 100 |
| | | | HDPE (NOVATEC HD HY420) | | — | 65 | — | — | — | — |
| | | Thermally decomposable foaming agent | Azodicarbonamide | | 7.0 | 0.0 | 0.0 | 7.0 | 4.5 | 1.7 |
| | | Decomposition temperature modifier | Zinc oxide | | 1.0 | 1.0 | 1.0 | 1.0 | 1.0 | 1.0 |
| | | Antioxidant | 2,6-Di-t-butyl-p-cresol | | 0.5 | 0.5 | 0.5 | 0.5 | 0.5 | 0.5 |
| Surface layer | Resin composition 2 | Resin | Metallocene LLDPE (KERNEL KF283) | Parts by mass | 100 | 100 | 100 | — | — | — |
| | | Thermally decomposable foaming agent | Azodicarbonamide | | 1.5 | 6.0 | 6.5 | — | — | — |
| | | Decomposition temperature modifier | Zinc oxide | | 1.0 | 1.0 | 1.0 | — | — | — |
| | | Antioxidant | 2,6-Di-t-butyl-p-cresol | | 0.5 | 0.5 | 0.5 | — | — | — |
| Production conditions | | Electron beam irradiation dose | | Mrad | 4.0 | 4.0 | 4.0 | 4.0 | 4.0 | 4.0 |

The configuration, performance, and evaluation results of the foam sheets of Examples 1C to 3C and Comparative Examples 1C to 3 are shown in Table 2. The thickness and expansion ratio of the surface layer in the table represent the thickness and expansion ratio of one surface layer of the surface layers provided on both sides of the base material, and the surface layers on both sides have the same thickness and expansion ratio.

TABLE 6

|  |  |  | Example | | | Comparative Example | | |
|---|---|---|---|---|---|---|---|---|
|  |  |  | 1C | 2C | 3C | 1C | 2C | 3C |
| Config- uration | Base layer | Structure | 3 Layers | 3 Layers | 3 Layers | 1 Layer | 1 Layer | 1 Layer |
|  |  | Thickness ($\mu$m) | 710 | 85 | 40 | 700 | 200 | 700 |
|  |  | Expansion ratio | 15.0 | — | — | 10.0 | 1.8 | 6.5 |
|  | Surface layer | Thickness ($\mu$m) | 45 | 245 | 80 | — | — | — |
|  |  | Expansion ratio | 1.6 | 8.0 | 3.0 | — | — | — |
|  | Entire multilayer foam sheet | Thickness ($\mu$m) | 800 | 500 | 200 | 700 | 200 | 700 |
|  |  | Expansion ratio | 7.7 | 4.0 | 1.8 | 10.0 | 1.8 | 6.5 |
|  |  | Density (g/cm$^3$) | 0.13 | 0.25 | 0.56 | 0.10 | 0.56 | 0.15 |
|  | Thickness of base layer/thickness of surface layer | | 15.8 | 0.3 | 0.5 | — | — | — |
| Perfor- mance | Gel fraction (% by mass) | | 34 | 20 | 28 | 34 | 38 | 42 |
|  | Closed cell ratio (%) | | 97 | 98 | 98 | 96 | 97 | 95 |
|  | Average cell diameter of base layer ($\mu$m) | | 134 | — | — | 130 | 105 | 86 |
|  | 25% Compressive strength (kPa) | | 50 | 55 | 120 | 56 | 850 | 130 |
|  | Moisture permeability (g/m · 24 hr) | | 14.1 | 4.8 | 8.9 | 23.3 | 10.3 | 13.2 |
|  | Comprehensive evaluation | | G | G | G | B | B | B |

The multilayer foam sheets of Examples 1C to 3C in Table 2 had a 25% compressive strength of 125 kPa or less and a moisture permeability of 15 g/m·24 hr or less, and thus both the gas sealability and level-difference conformability were satisfactory.

In contrast, the foam sheets of Comparative Examples 1C to 3C, which were single layer foam sheets, failed to make both the gas sealability and level-difference conformability satisfactory.

REFERENCE SIGNS LIST 11 test piece
12 wood plate
13 wood plate
14 SUS plate
15 glass plate
16 weight

The invention claimed is:

1. A multilayer foam sheet comprising: a base layer comprising a foam layer; and a surface layer comprising a foam layer or a resin film, the surface layer being laminated on each of both sides of the base layer,
   wherein the multilayer foam sheet has a low-speed shear modulus being 50 MPa or more,
   wherein the multilayer foam sheet has a 25% compressive strength being 125 kPa or less,
   wherein, in the multilayer foam sheet, a ratio of a thickness of the base layer to a thickness of the surface layer (thickness of base layer/thickness of surface layer) is 4.0 or more, and
   wherein the multilayer foam sheet has a gel fraction from 30 to 80%.

2. The multilayer foam sheet according to claim 1, wherein a tensile strength at break is 10 N/10 mm or more.

3. A multilayer foam sheet comprising: a base layer comprising a foam layer; and a surface layer comprising a foam layer or a resin film, the surface layer being laminated on each of both sides of the base layer,
   wherein the multilayer foam sheet has a 25% compressive strength being 125 kPa or less,
   wherein the multilayer foam sheet has a tensile strength at break being from 10 to 700 N/10 mm,
   wherein, in the multilayer form sheet, a ratio of a thickness of the base layer to a thickness of the surface layer (thickness of base layer/thickness of surface layer) is 4.0 or more, and
   wherein the multilayer form sheet has a gel fraction from 30 to 80%.

4. The multilayer foam sheet according to claim 1, wherein the multilayer foam sheet has a density from 0.07 to 0.22 g/cm$^3$.

5. The multilayer foam sheet according to claim 1, wherein the multilayer foam sheet has a thickness from 30 to 2000 $\mu$m.

6. The multilayer foam sheet according to claim 1, wherein an average cell diameter of the base layer is from 20 to 500 $\mu$m.

7. The multilayer foam sheet according to claim 1, wherein the multilayer foam sheet has a closed cell ratio of 90% or more.

8. The multilayer foam sheet according to claim 1, wherein the base layer comprises at least one resin selected from the group consisting of an olefinic thermoplastic resin and a thermoplastic elastomer.

9. A pressure-sensitive adhesive tape comprising: the multilayer foam sheet according to claim 1; and a pressure-sensitive adhesive material provided on at least one side of the multilayer foam sheet.

10. The pressure-sensitive adhesive tape according to claim 9 to be used in a display of 20 inches or larger.

11. A pressure-sensitive adhesive tape comprising: the multilayer foam sheet according to claim 3; and a pressure-sensitive adhesive material provided on at least one side of the multilayer foam sheet, wherein the pressure-sensitive adhesive tape is used in a back face or a frame of a display.

12. The pressure-sensitive adhesive tape according to claim 11, comprising: the multilayer foam sheet and a pressure-sensitive adhesive material provided on at least one side of the multilayer foam sheet, wherein when the pressure-sensitive adhesive tape is bonded to an adherend having a level difference, an area of a gap between the pressure-sensitive adhesive tape and the adherend is from 0 to 3.0 $cm^2$.

* * * * *